US012591841B2

(12) United States Patent
Lee

(10) Patent No.: US 12,591,841 B2
(45) Date of Patent: Mar. 31, 2026

(54) ASSET TRACKING SYSTEM AND METHOD

(71) Applicant: AMOSENSE CO., LTD., Cheonan-si (KR)

(72) Inventor: Sangyeoll Lee, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 225 days.

(21) Appl. No.: 18/563,293

(22) PCT Filed: May 18, 2022

(86) PCT No.: PCT/KR2022/007085
§ 371 (c)(1),
(2) Date: Nov. 21, 2023

(87) PCT Pub. No.: WO2022/245118
PCT Pub. Date: Nov. 24, 2022

(65) Prior Publication Data
US 2024/0220916 A1 Jul. 4, 2024

(30) Foreign Application Priority Data

| | | |
|---|---|---|
| May 21, 2021 | (KR) | 10-2021-0065696 |
| May 21, 2021 | (KR) | 10-2021-0065699 |
| May 21, 2021 | (KR) | 10-2021-0065701 |

(51) Int. Cl.
*G06Q 10/0833* (2023.01)
*G01S 13/02* (2006.01)
(Continued)

(52) U.S. Cl.
CPC ...... *G06Q 10/0833* (2013.01); *G01S 13/0209* (2013.01); *G01S 13/08* (2013.01); *H04W 4/029* (2018.02)

(58) Field of Classification Search
CPC .............. G06Q 10/0833; H04W 4/029; G01S 13/0209; G01S 13/08
See application file for complete search history.

(56) References Cited

U.S. PATENT DOCUMENTS

| | | |
|---|---|---|
| 5,621,417 A | 4/1997 | Hassan et al. |
| 11,310,630 B2 | 4/2022 | Baek et al. |
| (Continued) | | |

FOREIGN PATENT DOCUMENTS

| | | |
|---|---|---|
| CN | 111741431 A | 10/2020 |
| JP | H09133755 A | 5/1997 |
| (Continued) | | |

OTHER PUBLICATIONS

EP Extended European Search Report dated Oct. 21, 2024 in application 22804972.2.

(Continued)

*Primary Examiner* — An T Nguyen
(74) *Attorney, Agent, or Firm* — Maschoff Brennan

(57) ABSTRACT

According to an embodiment of the present invention: in order to track an accurate location of an asset, an asset location, which is a location of an asset terminal installed in the asset to be tracked, is measured; a relative location of the asset terminal, which is based on a reference terminal, is measured through communication between the reference terminal and the asset terminal; and the asset location is corrected using the relative location. Based on this, the present invention minimizes a measurement error of an asset location, compared to a scheme of measuring an asset location by using only GPS communication.

18 Claims, 35 Drawing Sheets

(51) Int. Cl.
    *G01S 13/08*     (2006.01)
    *H04W 4/029*     (2018.01)

(56)            References Cited

U.S. PATENT DOCUMENTS

| | | |
|---|---|---|
| 2007/0040647 A1 | 2/2007 | Saenz et al. |
| 2007/0164896 A1 | 7/2007 | Suzuki et al. |
| 2008/0191937 A1 | 8/2008 | Wisherd et al. |
| 2014/0049429 A1 | 2/2014 | Bruemmer et al. |
| 2020/0092683 A1 | 3/2020 | Fyfe et al. |
| 2022/0270458 A1* | 8/2022 | Mann ................. G08B 21/0277 |

FOREIGN PATENT DOCUMENTS

| | | |
|---|---|---|
| JP | 2007132768 A | 5/2007 |
| JP | 2009150722 A | 7/2009 |
| KR | 10-0819392 B1 | 4/2008 |
| KR | 10-2013-0093025 A | 8/2013 |
| KR | 10-2014-0086780 A | 7/2014 |
| KR | 1020190136961 A | 12/2019 |

OTHER PUBLICATIONS

JP Office Action dated Oct. 10, 2024 in application 2023572246.
KR Office Action dated Aug. 22, 2024 in application 1020210065701.
KR Office Action dated Aug. 22, 2024 in application 1020210065696.
AU Examination Report dated Jan. 3, 2025 as received in Application No. 2022276981.

* cited by examiner

| UNIQUE IDENTIFIER OF ASSET TERMINAL | UNIQUE IDENTIFIER OF REFERENCE TERMINAL | ASSET LOCATION | RELATIVE LOCATION | REFERENCE LOCATION | CORRECTED ASSET LOCATION |
|---|---|---|---|---|---|
| A1 | R1 | $(x1, y1, z1)$ | $(a1, b1, b1)$ | $(X1, Y1, Z1)$ | $(x1', y1', z1')$ |
| A2 | R1 | $(x2, y2, z2)$ | $(a2, b2, b2)$ | $(X1, Y1, Z1)$ | $(x2', y2', z2')$ |
| A3 | R1 | $(x3, y3, z3)$ | $(a3, b3, b3)$ | $(X1, Y1, Z1)$ | $(x3', y3', z3')$ |
| A4 | R1 | $(x4, y4, z4)$ | $(a4, b4, b4)$ | $(X1, Y1, Z1)$ | $(x4', y4', z4')$ |
| A5 | R1 | $(x5, y5, z5)$ | $(a5, b5, b5)$ | $(X1, Y1, Z1)$ | $(x5', y5', z5')$ |
| A6 | R1 | $(x6, y6, z6)$ | $(a6, b6, b6)$ | $(X1, Y1, Z1)$ | $(x6', y6', z6')$ |
| A7 | R2 | $(x7, y7, z7)$ | $(a7, b7, b7)$ | $(X2, Y2, Z2)$ | $(x7', y7', z7')$ |
| A8 | R2 | $(x8, y8, z8)$ | $(a8, b8, b8)$ | $(X2, Y2, Z2)$ | $(x8', y8', z8')$ |
| ⋮ | ⋮ | $(xn, yn, zn)$ | $(an, bn, bn)$ | ⋮ | ⋮ |
| An | Rm | | | $(Xm, Ym, Zm)$ | $(xn', yn', zn')$ |

| UNIQUE IDENTIFIER OF SLAVE ASSET TERMINAL | UNIQUE IDENTIFIER OF MASTER ASSET TERMINAL | ASSET LOCATION | RELATIVE LOCATION | REFERENCE LOCATION | CORRECTED ASSET LOCATION |
|---|---|---|---|---|---|
| A1 | – | (x1, y1, z1) | – | – | – |
| A2 | A1 | (x2, y2, z2) | (A2, b1, b1) | (X1, Y1, Z1) | (x2', y2', z2') |
| A3 | A1 | (x3, y3, z3) | (A3, b2, b2) | (X1, Y1, Z1) | (x3', y3', z3') |
| A4 | A1 | (x4, y4, z4) | (A4, b3, b3) | (X1, Y1, Z1) | (x4', y4', z4') |
| A5 | A1 | (x5, y5, z5) | (A5, b4, b4) | (X1, Y1, Z1) | (x5', y5', z5') |
| A6 | A1 | (x6, y6, z6) | (A6, b5, b5) | (X1, Y1, Z1) | (x6', y6', z6') |
| A7 | A1 | (x7, y7, z7) | (A7, b6, b6) | (X1, Y1, Z1) | (x7', y7', z7') |
| A8 | – | (x8, y8, z8) | – | – | – |
| A9 | A8 | (x9, y9, z9) | (a7, b7, b7) | (X2, Y2, Z2) | (x9', y9', z9') |
| A10 | A8 | (x10, y10, z10) | (a8, b8, b8) | (X2, Y2, Z2) | (x10', y10', z10') |
| ⋮ | ⋮ | ⋮ | ⋮ | ⋮ | ⋮ |
| An | Am | (xn, yn, zn) | (an, bn, bn) | (Xm, Ym, Zm) | (xn', yn', zn') |

| UNIQUE IDENTIFIER OF SLAVE ASSET TERMINAL | UNIQUE IDENTIFIER OF MASTER ASSET TERMINAL | ASSET LOCATION | RELATIVE LOCATION | REFERENCE LOCATION | CORRECTED ASSET LOCATION |
|---|---|---|---|---|---|
| A1 | – | $(x1, y1, z1)$ | – | – | – |
| A2 | A1 | – | $(A2, b1, b1)$ | $(x1, y1, z1)$ | $(x2', y2', z2')$ |
| A3 | A1 | – | $(A3, b2, b2)$ | $(x1, y1, z1)$ | $(x3', y3', z3')$ |
| A4 | A1 | – | $(A4, b3, b3)$ | $(x1, y1, z1)$ | $(x4', y4', z4')$ |
| A5 | A1 | – | $(A5, b4, b4)$ | $(x1, y1, z1)$ | $(x5', y5', z5')$ |
| A6 | A1 | – | $(A6, b5, b5)$ | $(x1, y1, z1)$ | $(x6', y6', z6')$ |
| A7 | A1 | – | $(A7, b6, b6)$ | $(x1, y1, z1)$ | $(x7', y7', z7')$ |
| A8 | – | $(x8, y8, z8)$ | – | – | – |
| A9 | A8 | – | $(a7, b7, b7)$ | $(x8, y8, z8)$ | $(x9', y9', z9')$ |
| A10 | A8 | – | $(a8, b8, b8)$ | $(x8, y8, z8)$ | $(x10', y10', z10')$ |
| ⋮ | ⋮ | ⋮ | ⋮ | ⋮ | ⋮ |
| An | Am | – | $(an, bn, bn)$ | $(xm, ym, zm)$ | $(xn', yn', zn')$ |

[FIG. 35]
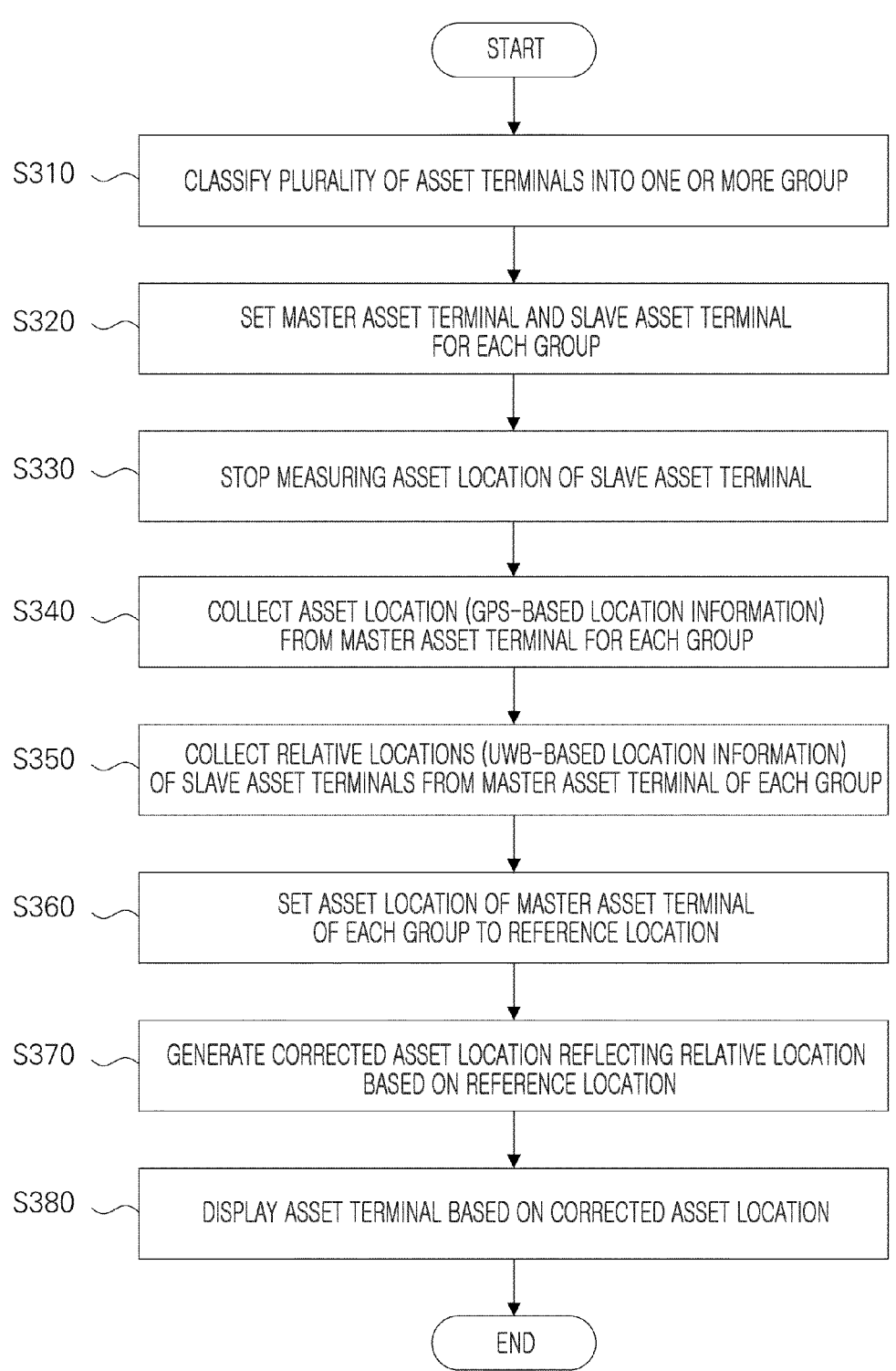

ASSET TRACKING SYSTEM AND METHOD

TECHNICAL FIELD

The present disclosure relates to a technology for tracking a location of an asset such as cargo, containers, and pallets.

BACKGROUND ART

Containers are used to transport cargo efficiently and economically. A container is loaded with cargo mounted on pallets and then transported via vehicles, ships, airplanes, or the like.

Since the container is left unattended in ports, warehouses, or the like for a long time before being loaded into a means of transportation or left unattended and used for a long time in a means of transportation, theft accidents of cargo loaded in containers, accidents involving the addition of illegal cargo, or the like frequently occur.

Therefore, for safe transportation and management of cargo, an asset tracking technology of installing various sensors on transportation structures such as containers and pallets and transmitting the sensing information and location information detected by these to a management server is applied.

A conventional asset tracking technology mainly uses a GPS system to track a location of an asset, and there is a problem in that it is difficult to track the accurate location of the asset due to a location deviation of a GPS.

SUMMARY OF INVENTION

Technical Problem

The present disclosure has been proposed to solve the problem and is directed to providing an asset tracking system and method of tracking an accurate location of an asset by correcting an asset location measured through GPS information using a relative location between a reference terminal and measurement targets.

Solution to Problem

In order to achieve the object, an asset tracking system according to an embodiment of the present disclosure includes a reference terminal, a plurality of asset terminals installed on an asset to be tracked and configured to perform UWB communication with the reference terminal and measure a relative location based on the reference terminal, and a management server configured to collect asset locations and the relative locations from the plurality of asset terminals and correct the asset locations of the asset terminals using the relative locations.

In order to achieve the object, an asset tracking method according to an embodiment of the present disclosure includes collecting asset locations generated based on GPS signals from the plurality of asset terminals, collecting relative locations based on the reference terminal generated through UWB communication between the reference terminal and the asset terminals from the plurality of asset terminals, generating a reference location corresponding to the reference terminal based on the asset locations collected in the collecting of the asset locations, and reflecting the relative locations based on the reference location generated in the generating of the reference location and generating corrected asset locations.

In order to achieve the object, an asset tracking method according to another embodiment of the present disclosure includes forming, by a plurality of asset terminals, one or more groups through mutual communication, setting a master asset terminal and a plurality of slave asset terminals of a group by asset terminals belonging to each group in the forming of the group, collecting, by a management server, one of asset locations of the plurality of slave asset terminals generated based on GPS signals from the master asset terminal of each group and an asset location of the master asset terminal, collecting, by the management server, relative locations of the plurality of slave asset terminals based on the master asset terminal from the master asset terminal of each group, setting, by the management server, a reference location based on the asset location of the master asset terminal collected in the collecting of the asset location, and reflecting, by the management server, the relative locations based on the reference location generated in the generating of the reference location to generate corrected asset locations of the plurality of slave asset terminals.

Advantageous Effects of Invention

According to the present disclosure, in the asset tracking system and method, by reflecting the relative location measured through UWB communication and correcting the asset location measured based on the GPS communication, it is possible to minimize the measurement error of the asset location compared to the conventional method of measuring the asset location using only GPS communication.

In addition, in the asset tracking system and method, by reflecting the relative location measured through UWB communication and correcting the asset location measured based on GPS communication, it is possible to increase the accuracy of the asset tracking because the error with the actual location partially occurs but the relative location based on the reference terminal may be displayed identically to the actual location.

In addition, in the asset tracking system and method, by classifying the plurality of asset terminals into groups, setting at least one master asset terminal to each group, and correcting the asset location measured through the GPS information using the relative location between the master asset terminal and the slave asset terminals, it is possible to minimize the measurement error of the asset location compared to the conventional method of measuring the asset location using only the GPS communication. In this case, in the asset tracking system and method, it is possible to increase the accuracy of the asset tracking because the error with the actual location partially occurs but the relative location based on the reference terminal may be displayed identically to the actual location.

In addition, in the asset tracking system and method, by classifying the plurality of asset terminals into groups, setting the location of the master asset terminal of each group to the reference location, and setting the asset location using the relative location of the slave asset terminal, it is possible to accurately track the relative location between the assets.

In addition, in the asset tracking system and method, by driving the GPS communication module of the master asset terminal and stopping the driving of the GPS communication module of the slave asset terminals, it is possible to improve the efficiency of the battery mounted in the asset terminal, thereby extending the period during which the location of the asset loaded for a long time may be tracked.

BRIEF DESCRIPTION OF DRAWINGS

FIG. 5 is a view for describing a location information storage module in FIG. 4.

FIG. 18 is a view for describing a location information storage module in FIG. 17.

FIG. 32 is a view for describing a location information storage module in FIG. 31.

FIG. 35 is a flowchart for describing an asset tracking method according to an embodiment of the present disclosure.

DESCRIPTION OF EMBODIMENTS

Figure 1:
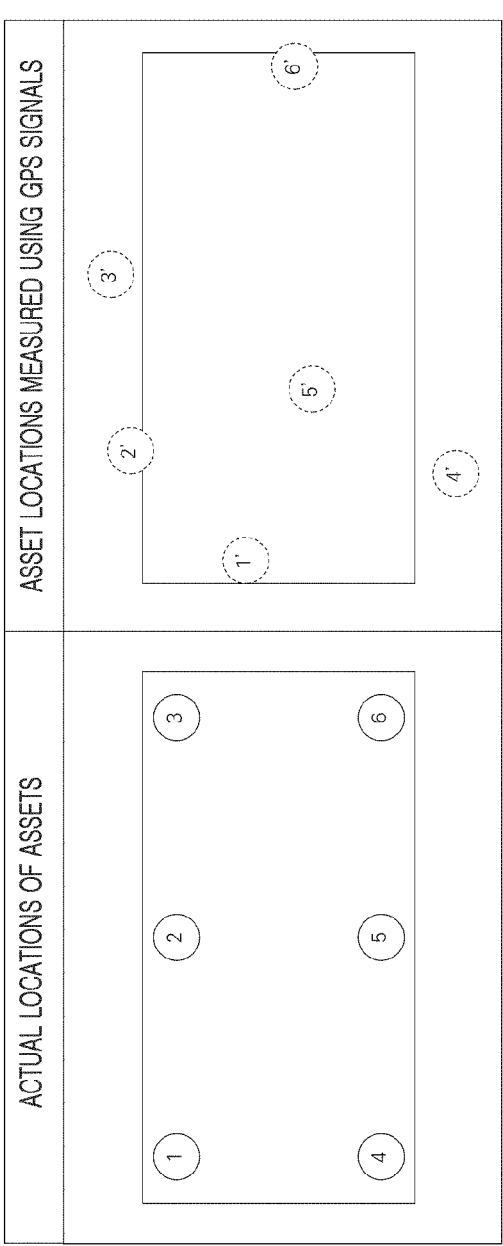
FIG. 1 is a view for describing a conventional asset tracking system.

Hereinafter, the most preferred embodiment of the present disclosure will be described with reference to the accompanying drawings in order to describe the present disclosure in detail to the extent that those skilled in the art can easily carry out the technical spirit of the present disclosure. First, in adding reference numerals to components in each drawing, it should be noted that the same components have the same reference numerals as much as possible even when they are shown in different drawings. In addition, in describing embodiments of the present disclosure, when it is determined that the detailed description of related known configurations or functions may obscure the gist of the present disclosure, a detailed description thereof will be omitted.

Referring to FIG. 1, conventionally, in order to track locations of assets 1, 2, 3, 4, 5, and 6, a GPS-based location tracking terminal is mainly attached to assets (i.e., containers) and loaded in a yard. In this case, the asset tracking system tracks the location of the asset using location information measured by the location tracking terminal.

The tracking terminals mainly measure location information 1', 2', 3', 4', 5', and 6' corresponding to current locations of the assets using a GPS. However, since the measurement using the GPS may cause a measurement error of tens of meters or more, a location differing from an actual location of the asset may be measured as the asset location, and thus the asset location may not be accurately tracked, and the relative locations of the assets are tracked differently from the actual locations.

In the first embodiment of the present disclosure, the accurate location of the asset is tracked by correcting the asset location determined through the GPS information using the relative location between a reference terminal and measurement targets. In other words, in the first embodiment of the present disclosure, by correcting the asset location measured based on the GPS using UWB communication, it is possible to minimize an error between the actual location of the asset and the measured location and allow the relative arrangement of the assets to be identified identically to the actual arrangement.

Figure 2:
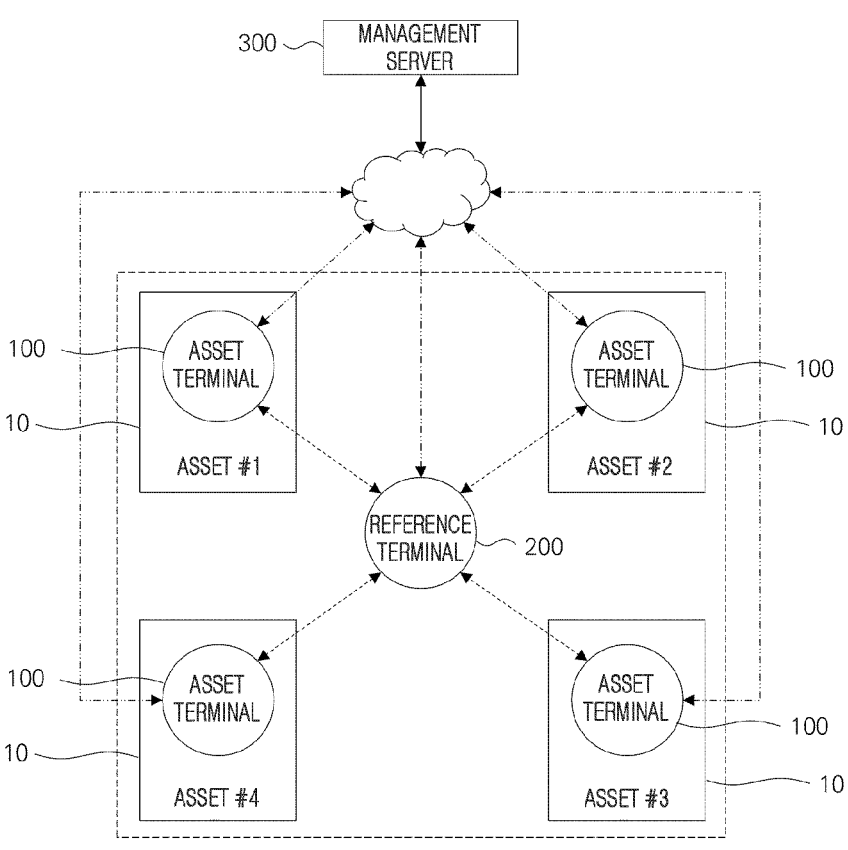
FIG. 2 is a view for describing an asset tracking system according to a first embodiment of the present disclosure.

To this end, referring to FIG. 2, the asset tracking system according to the embodiment of the present disclosure includes a plurality of asset terminals 100, a reference terminal 200, and a management server 300.

The asset terminal 100 is a communication terminal mounted (or installed) on the asset 10 for asset management. The asset terminal 100 generates first location information corresponding to a current location of the asset 10 through GPS communication. The asset terminal 100 generates second location information corresponding to a relative location with the reference terminal 200 through UWB communication. Here, the asset terminal 100 generates the second location information including a direction and a distance. The asset terminal 100 transmits the first location information and the second location information to the management server 300.

Figure 3:
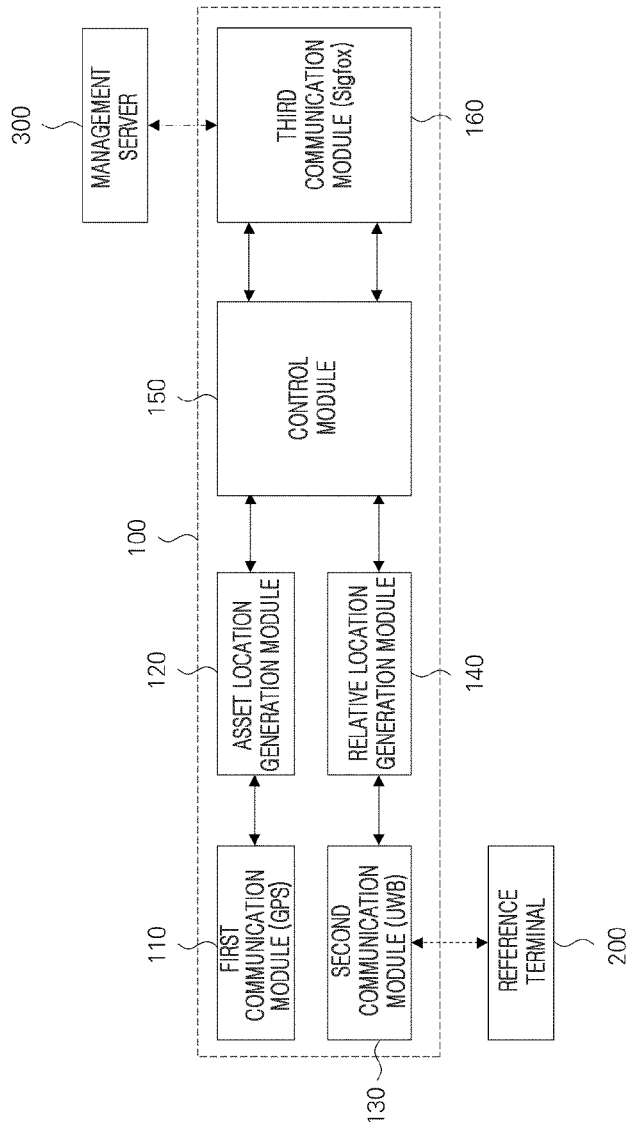
FIG. 3 is a view for describing a configuration of an asset terminal in FIG. 2.

Referring to FIG. 3, the asset terminal 100 includes a first communication module 110, an asset location generation module 120, a second communication module 130, a relative location generation module 140, a control module 150, and a third communication module 160. Here, as an example, the first communication module 110 is a GPS communication module for receiving GPS signals from satellites, the second communication module 130 is a UWB communication module for communicating with the adjacent reference terminal 200, and the third communication module 160 is a Sigfox communication module for communicating with the management server 300 and the asset terminal 100 through low-power communication.

The first communication module 110 receives a signal in a GPS frequency band (hereinafter referred to as a GPS signal). The GPS signals received by the first communication module 110 are transmitted to the asset location generation module 120.

The asset location generation module 120 generates an asset location corresponding to the current location of the asset 10 based on the GPS signal transmitted from the first communication module 110 in response to an asset location generation request of the control module 150. Here, since the generation of the location information using the GPS signals is a common technology, a detailed description thereof will be omitted.

The asset location generation module 120 generates a first location information transmission request including the asset location and a unique identifier of the asset terminal 100. The asset location generation module 120 transmits the first location information transmission request to the control module 150.

The second communication module 130 transmits and receives a signal in a UWB frequency band (hereinafter referred to as a UWB signal). The second communication module 130 transmits and receives UWB signals to and from the reference terminal 200 and transmits the received information to the relative location generation module 140.

The relative location generation module 140 transmits a measurement request requesting the measurement of the relative location to the second communication module 130 in response to the asset location generation request of the control module 150. The relative location generation module 140 receives a delay time from the second communication module 130 and based on this, generates the relative location of the asset terminal 100 based on the reference module. At this time, the relative location generation module 140 generates the relative location through measurement technologies such as time difference of arrival (TDoA) and two way ranging (TWR).

For example, the second communication module 130 receives UWB signals (i.e., an advertising signal and a location measurement request signal) from the reference terminal 200 and transmits the UWB signals to the relative location generation module 140. The relative location generation module 140 transmits a ranging request signal transmission request to the second communication module 130, and the second communication module 130 transmits a ranging request signal to the reference terminal 200 in response to the ranging request signal transmission request. The reference terminal 200 receiving the ranging request signal transmits a first UWB pulse, and the second communication module 130 transmits a second UWB pulse in response to the first UWB pulse transmitted from the reference terminal 200. The reference terminal 200 calculates a delay time between the first UWB pulse and the second UWB pulse and transmits the delay time to the second communication module 130. The second communication module 130 transmits the received delay time to the relative location generation module 140, and the relative location generation module 140 generates the relative location of the asset terminal 100 based on the location of the reference terminal 200 using the delay time.

The relative location generation module 140 generates second location information including a relative location, a unique identifier of the reference terminal 200, and a unique identifier of the asset terminal 100. The relative location generation module 140 transmits the second location information to the control module 150.

The control module 150 transmits the asset location generation request to the asset location generation module 120 and the relative location generation module 140. At this time, the control module 150 receives the asset location generation request from the management server 300 through the second communication module 130 or transmits the asset location generation request when a set time arrives.

The control module 150 receives the first location information and the second location information in response to the asset location generation request. The control module 150 receives the first location information, which is location information generated based on the GPS signals, from the asset location generation module 120. The control module 150 receives the second location information, which is relative location information generated based on the UWB signals, from the relative location generation module 140.

The control module 150 generates a location information transmission request including the first location information and the second location information. At this time, the control module 150 may generate the first location information transmission request including the first location information and a second location information transmission request including the second location information. The control module 150 transmits the location information transmission request to the third communication module 160.

The third communication module 160 transmits the first location information and the second location information to the management server 300 in response to the location information transmission request of the control module 150. The third communication module 160 converts the first location information and the second location information into a Sigfox protocol and transmits the converted first and second location information to the management server 300.

The reference terminal 200 is a communication terminal disposed around the asset 10 to correct the location measured by the asset terminal 100. The reference terminal 200 may be formed of a mobile terminal carried by a manager, an asset terminal 100 installed on the asset 10, a terminal fixedly installed in a location at which the asset terminal 100 is loaded, one of a plurality of asset terminals 100, or the like.

The reference terminal 200 transmits and receives the UWB signals to and from the second communication module 130 of the asset terminal 100. To this end, the reference terminal 200 includes a communication module capable of communicating with the second communication module 130 of the asset terminal 100. The reference terminal 200 outputs the advertising signal or the location measurement request signal. The reference terminal 200 transmits the first UWB pulse to the asset terminal 100 in response to the ranging request signal of the asset terminal 100. The reference terminal 200 receives the second UWB pulse from the asset terminal 100 in response to the first UWB pulse. The reference terminal 200 calculates the delay time between the first UWB pulse and the second UWB pulse and transmits the calculated delay time to the asset terminal 100.

The management server 300 collects location information from the plurality of asset terminals 100. The management server 300 collects GPS-based asset locations and UWB-based relative locations. The management server 300 corrects the asset location using the relative location and outputs a corrected asset location generated as a result of the correction.

Figure 4:
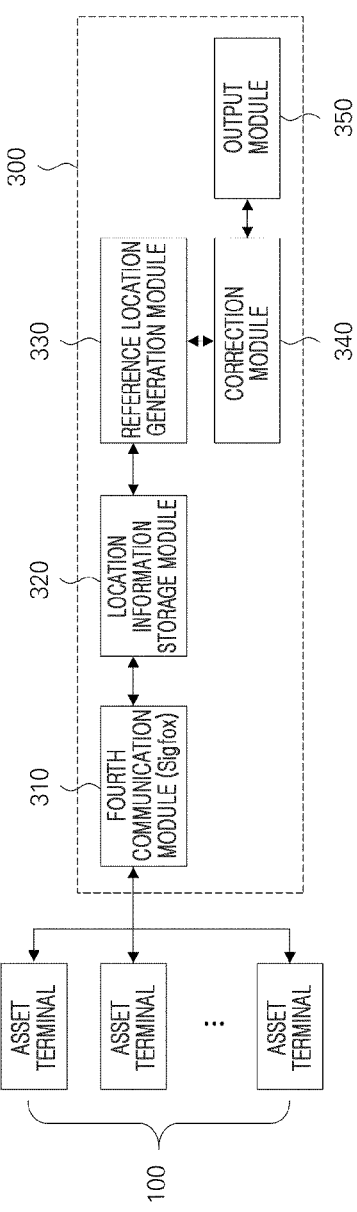
FIG. 4 is a view for describing a configuration of a management server in FIG. 2.

To this end, referring to FIG. 4, the management server 300 includes a fourth communication module 310, a location information storage module 320, a reference location generation module 330, a correction module 340, and an output module 350.

The fourth communication module 310 receives the first location information and the second location information from the plurality of asset terminals 100. The fourth communication module 310 receives the first location information including an asset location and a unique identifier of the asset terminal 100, and the second location information including a relative location, a unique identifier of the reference terminal 200, and a unique identifier of the asset terminal 100. The fourth communication module 310 transmits a location information storage request including the first location information and the second location information to the location information storage module 320.

The location information storage module 320 stores the first location information and the second location information in response to a location information storage request of the fourth communication module 210. At this time, referring to FIG. 5, the location information storage module 320 stores the first location information and the second location information in conjunction with the unique identifier of the asset terminal 100, the unique identifier of the reference terminal 200, the asset location, and the relative location.

The location information storage module 320 detects a unique identifier and a reference location from the reference location storage request in response to a reference location storage request of the reference location generation module 330. The location information storage module 320 stores the reference location in conjunction with the unique identifier of the reference terminal 200, which is the same as the detected unique identifier.

The location information storage module 320 detects a unique identifier and a corrected asset location from the asset location storage request in response to an asset location storage request of the correction module 340. The location information storage module 320 stores the corrected asset location in conjunction with the unique identifier of the asset terminal 100, which is the same as the detected unique identifier.

The reference location generation module 330 generates the reference location of the reference terminal 200 based on the asset locations and the relative locations stored in the location information storage module 320.

The reference location generation module 330 detects information connected to the unique identifier of the same reference terminal 200 from the location information storage module 320. The reference location generation module 330 detects the unique identifier, the asset location, and the relative location of the asset terminal 100 connected to the unique identifier of the same reference terminal 200.

The reference location generation module 330 extracts a midpoint of two asset terminals 100 located at facing points based on the reference terminal 200. At this time, the reference location generation module 330 detects a location of each asset terminal 100 moved in a direction of the relative location from the asset location by a distance of the relative location. The reference location generation module 330 extracts a ½ point of a straight line connecting the locations of the two asset terminals 100 located at the facing points among the detected locations as a midpoint.

Meanwhile, the reference location generation module 330 may generate the reference location of the reference terminal 200 based on the asset location stored in the location information storage module 320.

The reference location generation module 330 detects information connected to the unique identifier of the same reference terminal 200 from the location information storage module 320. The reference location generation module 330 detects the unique identifier and the asset location of the asset terminal 100 connected to the unique identifier of the same reference terminal 200.

The reference location generation module 330 extracts a midpoint of two asset terminals 100 located at facing points based on the reference terminal 200. At this time, the reference location generation module 330 extracts a ½ point of a straight line connecting the asset locations of the two asset terminals 100 located at the facing points based on the reference terminal 200 as a midpoint.

When the extraction of the midpoints is finished, the reference location generation module 330 extracts a center point of a figure connecting the midpoints and generates the extracted center point as the reference location (i.e., the location of the reference terminal 200). The reference location generation module 330 generates a reference location storage request including the unique identifier and the reference location of the reference terminal 200 and transmits the reference location storage request to the location information storage module 320. The reference location generation module 330 transmits a location correction request including the unique identifier and the reference location of the reference terminal 200 to the correction module 340.

The correction module 340 generates a corrected asset location in response to the location correction request of the reference location generation module 330. In other words, the correction module 340 detects the unique identifier and the reference location of the reference terminal 200 from the location correction request. The correction module 340 detects the unique identifier and the relative location of the asset terminal 100 connected to the unique identifier of the reference terminal 200 from the location information storage module 320. The correction module 340 sets the reference location as a reference point and generates the corrected asset location of each asset terminal 100 by reflecting the relative location and arranging the asset terminal 100. The correction module 340 generates an asset location storage request including the unique identifier of the asset terminal 100 and the corrected asset location and transmits the asset location storage request to the location information storage module 320. The correction module 340 generates an asset output request and transmits the asset output request to the output module 350.

The output module 350 outputs the reference terminal 200 and the plurality of asset terminals 100 on a screen in response to the output request of the correction module 340. At this time, the output module 350 outputs a screen on which the reference terminal 200 is displayed at the reference location and the asset terminal 100 is displayed at the corrected asset location.

An example in which the management server 300 corrects the location of the asset terminal 100 will be described with reference to FIGS. 6 to 10 as follows.

Figure 6:
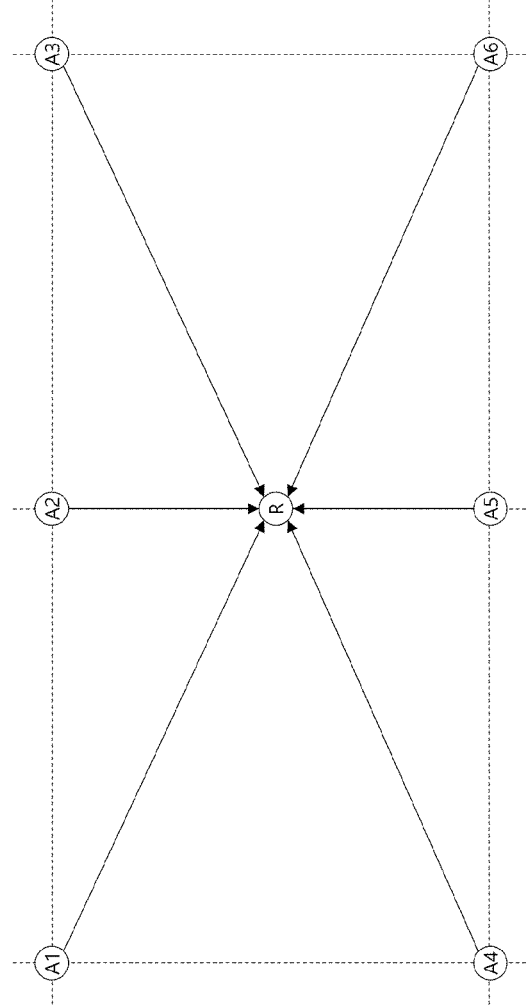
FIGS. 6 to 11 are views for describing an example in which the management server in FIG. 2 tracks (corrects) a location of the asset terminal.

First, as illustrated in FIG. 6, a state in which a first asset terminal A1 to a sixth asset terminal A6 are stored in the yard will be described as an example. The first asset terminal A1 and the sixth asset terminal A6 are located at facing points based on a reference terminal R, the second asset terminal A2 and the fifth asset terminal A5 are located at facing points based on the reference terminal R, and the third asset terminal A3 and the fourth asset terminal A4 are located at facing points based on the reference terminal R.

Figure 7:
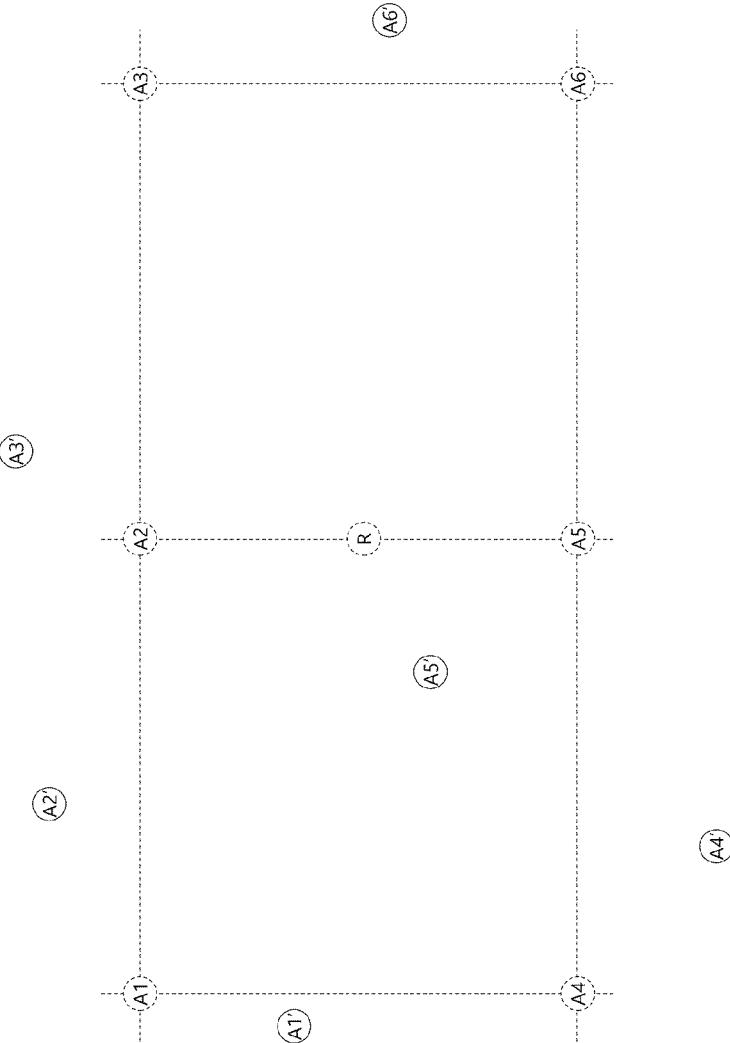

Referring to FIG. 7, since asset locations A1' to A6' are generated based on GPS signals, the asset locations A1' to A6' collected from the asset terminal 100 are displayed differently from actual locations, and the relative locations between the asset terminals 100 are also displayed differently from the actual locations.

To correct this, the management server 300 sets a reference location corresponding to the location of the reference terminal 200.

Figure 8:
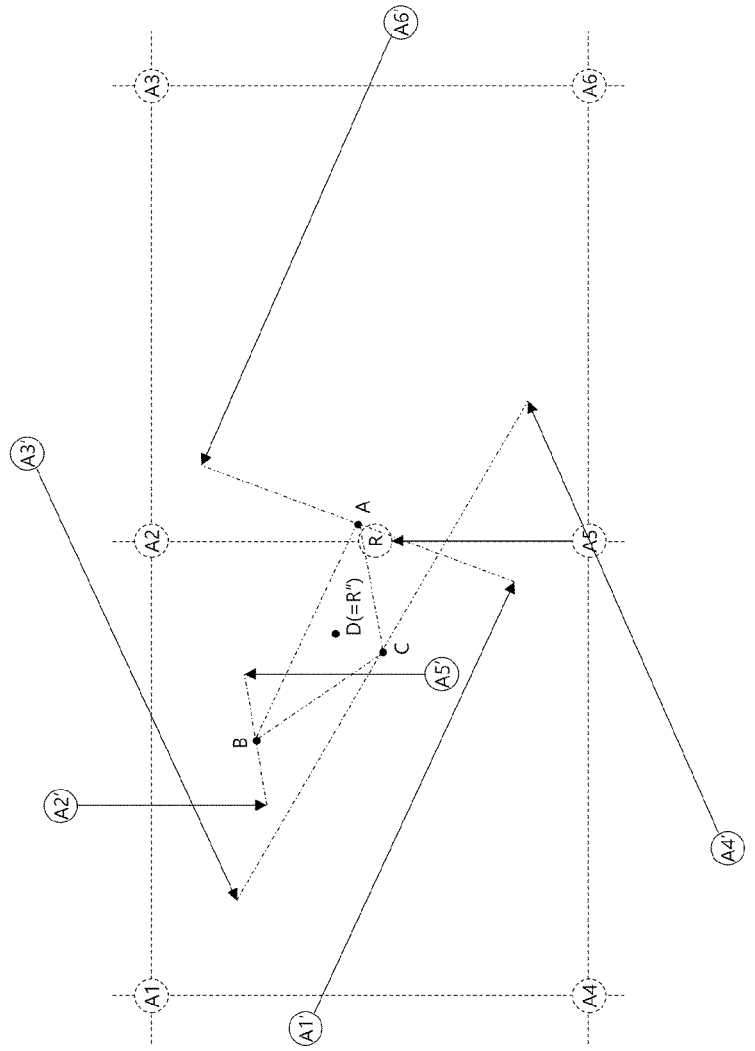

Referring to FIG. 8, the management server 300 detects a location of each asset terminal 100 moved in a direction of the relative location by a distance of the relative location from an asset location as the asset location.

The management server 300 extracts a ½ point of a straight line connecting asset locations of two asset terminals 100 located at facing points based on the reference terminal 200 as a midpoint. At this time, A, which is a center point of the first asset terminal A1 and the sixth asset terminal A6, B, which is a center point of the second asset terminal A2 and the fifth asset terminal A5, and C, which is a center point of the third asset terminal A3 and the fourth asset terminal A4, are extracted.

The management server 300 extracts a center point D of a triangle formed by connecting the extracted midpoints A, B, and C and generates the center point D as a reference location R″ (i.e., a location of the reference terminal 200).

Figure 9:
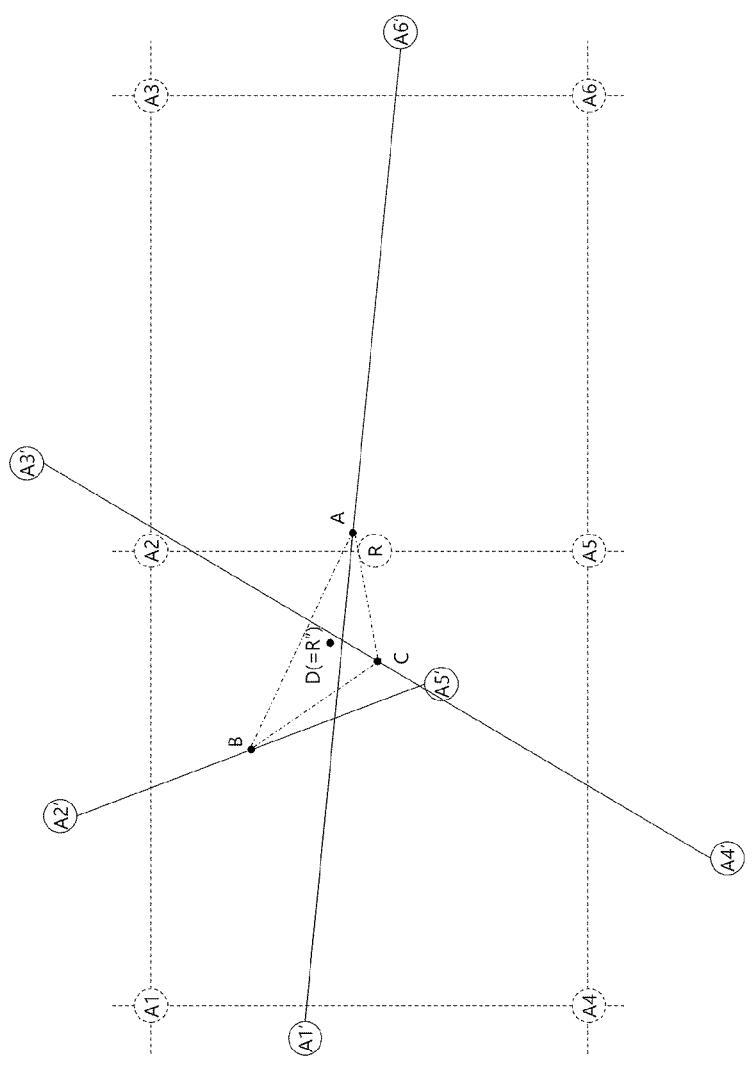

Meanwhile, referring to FIG. 9, the management server 300 may extract ½ points of straight lines connecting asset locations (asset locations not reflecting the relative location) of two asset terminals 100 located at the facing points based on the reference terminal 200 as midpoints A, B, and C.

Figure 10:
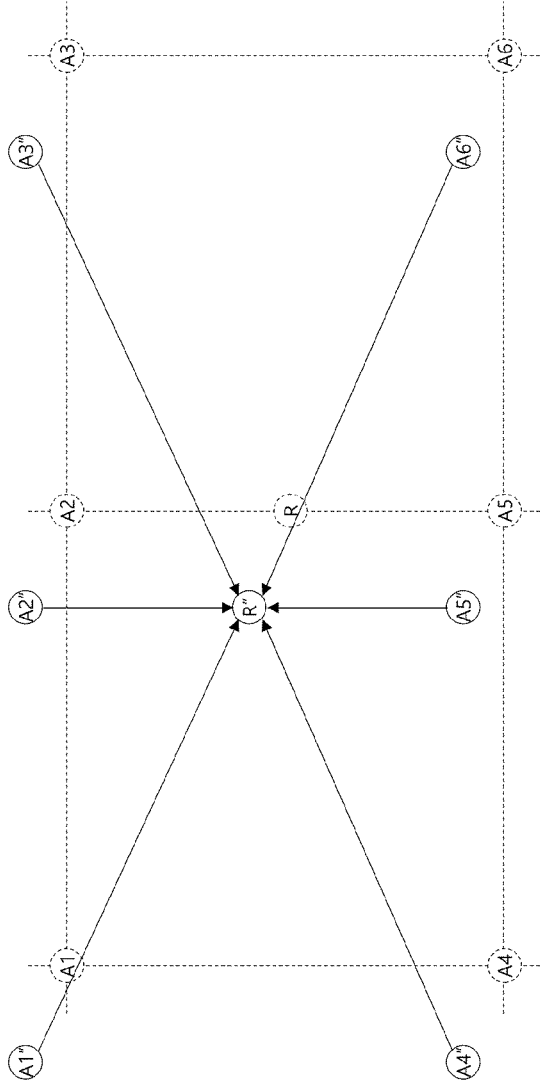

Referring to FIG. 10, the management server 300 sets the reference location R″ to the location of the reference terminal 200 and generates corrected asset locations A1″ to A6″ of the asset terminals 100 by reflecting the relative location of the asset terminal 100 based on the reference location R″ and arranging each asset terminal 100.

Figure 11:
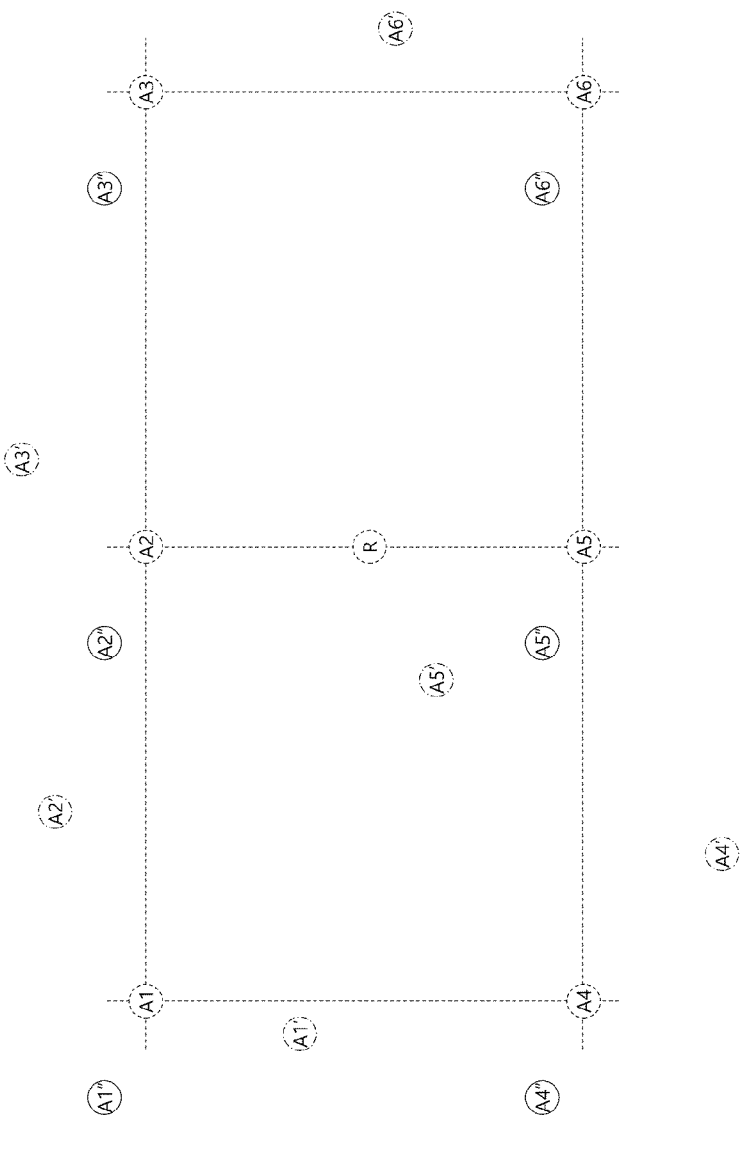

Therefore, as illustrated in FIG. 11, the corrected asset locations A1″ to A6″ generated by the management server 300 may have a reduced error compared to the asset locations A1′ to A6′ measured based on the GPS signals, and errors with the actual locations A1 to A6 occur but the relative locations based on the reference terminal 200 may be displayed identically, and thus it is possible to increase the accuracy of the asset tracking.

Hereinafter, an asset tracking method according to an embodiment of the present disclosure will be described with reference to the accompanying drawings.

Figure 12:
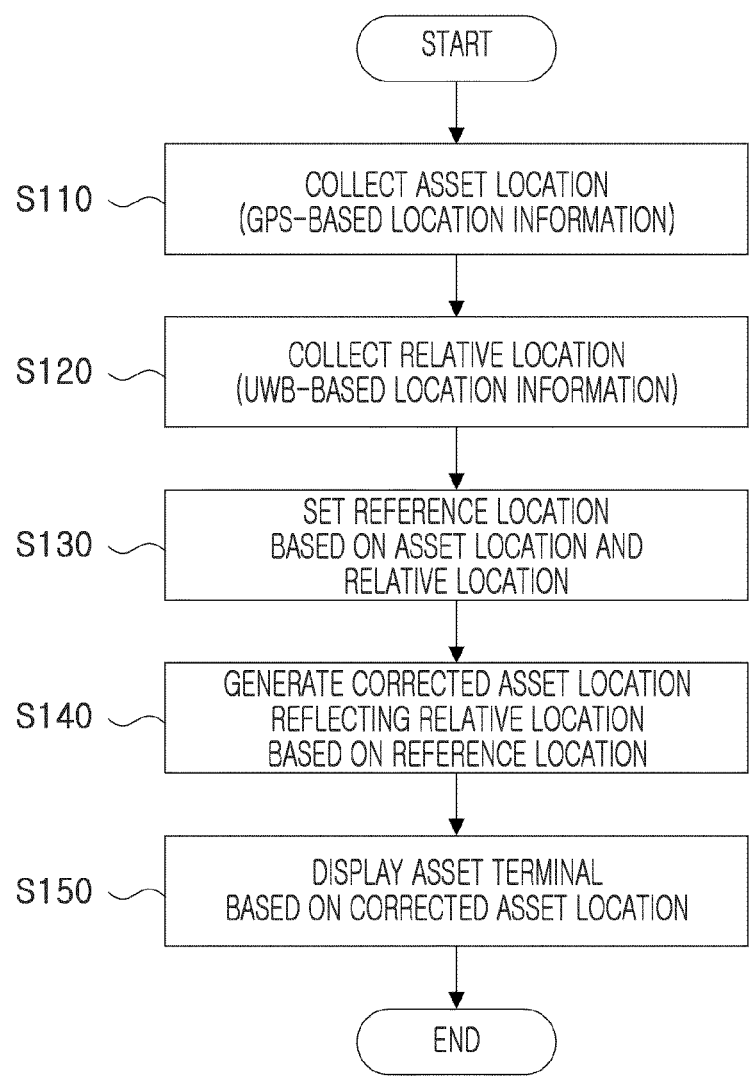
FIG. 12 is a flowchart for describing an asset tracking method according to the first embodiment of the present disclosure.

Referring to FIG. 12, the management server 300 collects asset locations from the plurality of asset terminals 100 (S110). The plurality of asset terminals 100 measure the asset locations based on the GPS signals and transmit the asset locations to the management server 300 at the request of the management server 300. The management server 300 stores the asset locations received from the plurality of asset terminals 100. At this time, the management server 300 stores the asset locations in conjunction with the unique identifier and the asset location of the asset terminal 100.

The management server 300 collects the relative locations from the plurality of asset terminals 100 (S120). The plurality of asset terminals 100 measure the relative locations based on the reference terminal 200 through the UWB communication with the reference terminal 200 and transmit the relative locations to the management server 300 at the request of the management server 300. The management server 300 stores the relative locations received from the plurality of asset terminals 100. At this time, the management server 300 stores the relative locations in conjunction with the unique identifier of the asset terminal 100, and the unique identifier and the relative location of the reference terminal 200.

The management server 300 sets the reference location based on the asset location and the relative location (S130).

Figure 13:
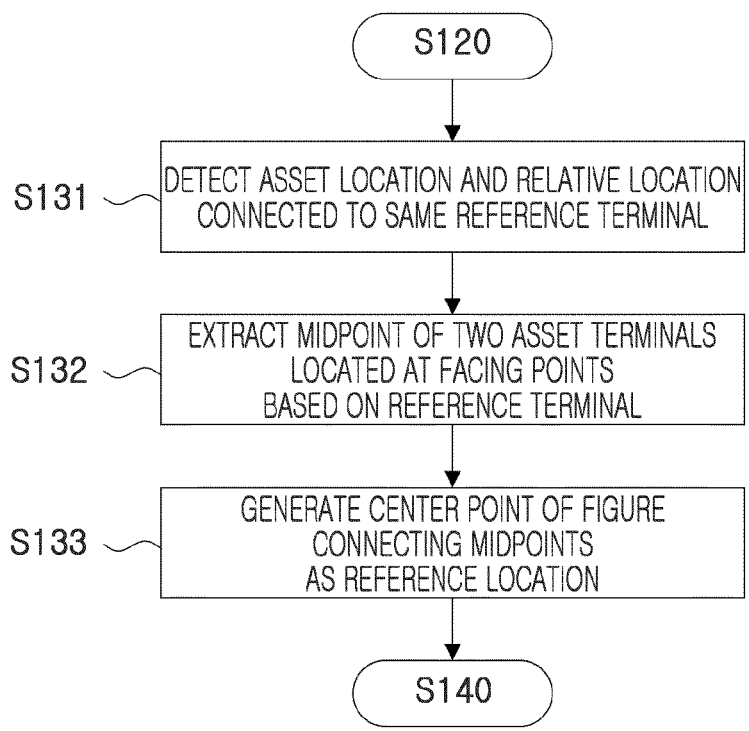
FIG. 13 is a flowchart for describing setting a reference location in FIG. 12.

Referring to FIG. 13, the management server 300 detects the asset location and the relative location connected to the same reference terminal 200 (i.e., the unique identifier of the reference terminal 200) among the stored asset locations and relative locations (S131).

The management server 300 extracts the midpoint of the two asset terminals 100 located at the facing points based on the reference terminal 200 (S132). At this time, the management server 300 detects a location of each asset terminal 100 moved in a direction of the relative location from the asset location by the distance of the relative location. The reference location generation module 330 extracts a ½ point of a straight line connecting the locations of the two asset terminals 100 located at the facing points among the detected locations as a midpoint.

Meanwhile, in operation S132, the management server 300 may extract the midpoint using only the asset location. In other words, the management server 300 detects the unique identifier and the asset location of the asset terminal 100 connected to the unique identifier of the same reference terminal 200. The management server 300 extracts the midpoint of the two asset terminals 100 located at the facing points based on the reference terminal 200. At this time, the management server 300 extracts a ½ point of a straight line connecting asset locations of two asset terminals 100 located at facing points based on the reference terminal 200 as a midpoint.

The management server 300 extracts the center point of the figure connecting the midpoints detected in operation S132 and generates the center point as the reference location (i.e., the location of the reference terminal 200) (S133). The management server 300 stores the reference location in conjunction with the unique identifier of the reference terminal 200.

The management server 300 generates the corrected asset location by reflecting the relative location based on the reference location set in operation S130 (S140). The management server 300 detects the unique identifier and the relative location of the asset terminal 100 connected to the unique identifier of the reference terminal 200. The management server 300 sets the reference location to the reference point and generates the corrected asset location of each asset terminal 100 by reflecting the relative location and arranging the asset terminal 100. The management server 300 stores the unique identifier and the corrected asset location of the asset terminal 100 in conjunction with each other.

The management server 300 displays the asset terminal 100 based on the stored corrected asset location (S150). In other words, the management server 300 outputs the reference terminal 200 and the plurality of asset terminals 100 on the screen, displays the reference terminal 200 at the reference location, and displays the asset terminal 100 at the corrected asset location.

Therefore, the asset tracking method according to the embodiment of the present disclosure can reduce errors compared to the asset locations measured based on the GPS signals, and some errors with the actual locations occur but the relative locations based on the reference terminal 200 may be displayed identically, and thus it possible to increase the accuracy of the asset tracking.

In a second embodiment of the present disclosure, the accurate location of the asset may be tracked by classifying a plurality of asset terminals into groups, setting at least one master asset terminal in each group, and correcting the asset location measured through GPS information using the relative locations between the master asset terminal and the slave asset terminals.

In other words, in the second embodiment of the present disclosure, the plurality of asset terminals are divided into a plurality of groups through UWB communication. The asset tracking system sets one of the asset terminals belonging to each group as the master asset terminal and sets the remaining asset terminals as the slave asset terminals. The master asset terminal measures the relative location with the slave asset terminal through UWB communication and transmits the location information measured at set time intervals to the management server. Therefore, the asset tracking system identifies the relative arrangement of the same assets as the actual arrangement.

Figure 14:
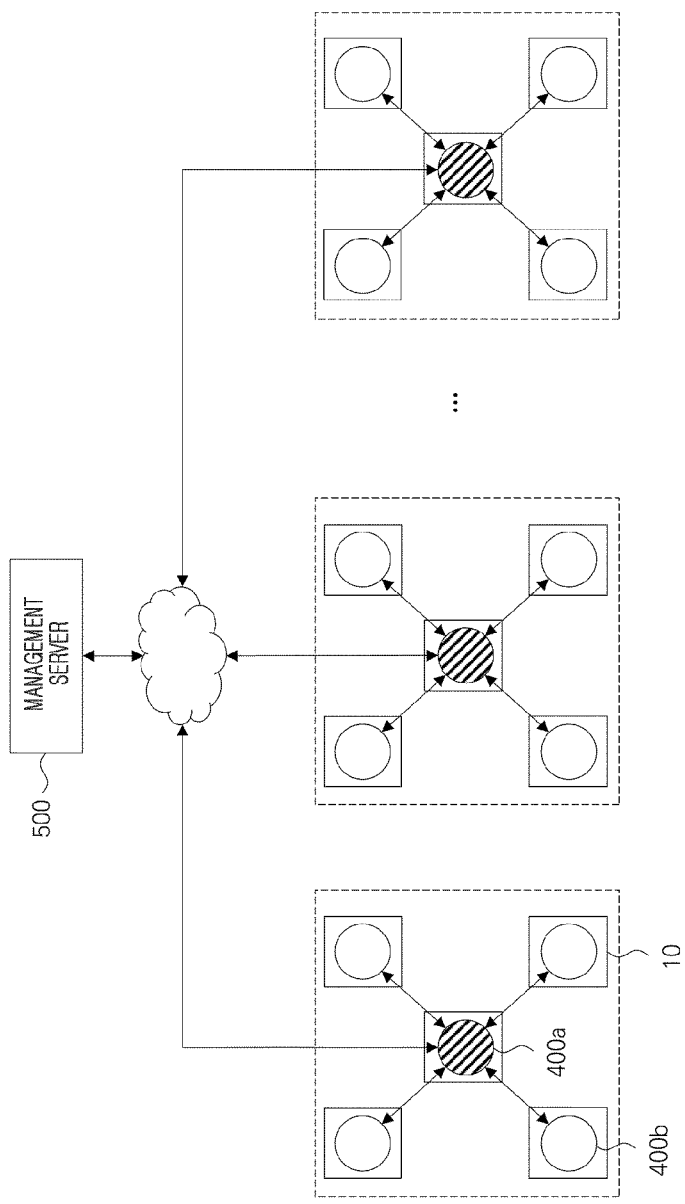
FIG. 14 is a view for describing an asset tracking system according to a second embodiment of the present disclosure.

To this end, referring to FIG. 14, the asset tracking system includes a plurality of asset terminals 400a and 400b and a management server 500.

The plurality of asset terminals 400a and 400b are communication terminals each mounted (or installed) on the asset 10 for asset management. The plurality of asset terminals 400a and 400b are divided into a plurality of groups reflecting a communication range, a location, and the like. In this case, the plurality of asset terminals 400a and 400b communicate with each other through UWB communication to generate relative locations and form one or more groups based on this.

The group formed as described above includes the two or more asset terminals 400a and 400b. One of the asset terminals 400a and 400b belonging to the same group operates as the master asset terminal 400a, which is the reference of the asset tracking, and the remaining asset terminals operate as the slave asset terminals 400b. In other words, the plurality of asset terminals 400a and 400b are divided into one or more groups, and each group includes one master asset terminal 400a and the plurality of slave asset terminals 400b.

The master asset terminal 400a generates the asset location through GPS communication and generates the relative location of the asset 10 in which the slave asset terminal 400b is installed through UWB communication with the slave asset terminals 400b belonging to the same group. Here, the relative location is a relative location of the slave asset terminal 400b based on the location of the master asset terminal 400a, and the relative location may include a direction and a distance.

The master asset terminal 400a transmits location information to the management server 500 at set time intervals or at the request of the management server 500. At this time, the master asset terminal 400a transmits location information including the asset location, which is the location of the asset 10 in which the master asset terminal 400a is installed, and the relative locations of the assets 10 in which the slave asset terminal 400b is installed to the management server 500.

Meanwhile, when one asset terminal continuously operates as the master asset terminal 400a, the battery efficiency of the corresponding asset terminal is inevitably degraded. Therefore, the plurality of asset terminals 400a and 400b change the master asset terminal 400a to another asset terminal depending on GPS communication quality, UWB communication quality, the remaining battery level, or the like. In other words, one of the slave asset terminals 400b is set to a new master asset terminal 400a, and the current master asset terminal 400a is changed to the slave asset terminal 400b.

Figure 15:
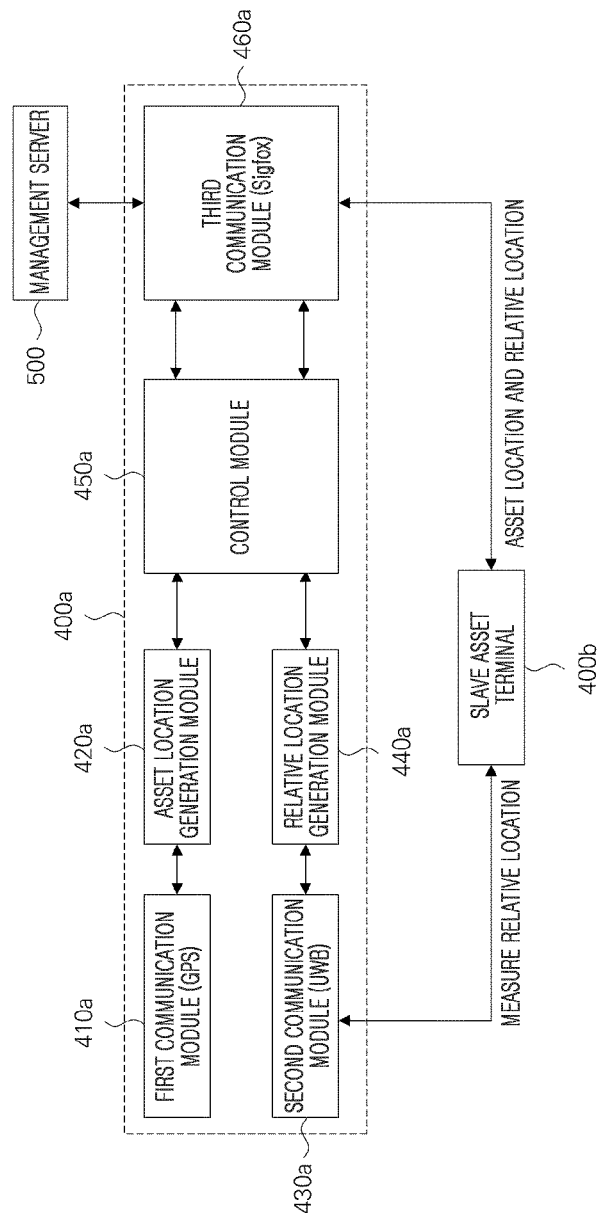
FIG. 15 is a view for describing a master asset terminal in FIG. 14.

Referring to FIG. 15, the master asset terminal 400a includes a first communication module 410a, an asset location generation module 420a, a second communication module 430a, a relative location generation module 440a, a control module 450a, and a third communication module 460a. Here, as an example, the first communication module 410a is a GPS communication module for receiving GPS signals from satellites, the second communication module 430a is a UWB communication module for communicating with the slave asset terminal 400b belonging to the same group, and the third communication module 460a is a Sigfox communication module for communicating with the management server 500 and the slave asset terminal 400b belonging to the same group through low-power communication.

In this case, since the master asset terminal 400a is the reference for relative location measurement, the relative location generation module does not perform a separate operation. However, since the master asset terminal 400a may later be changed to the slave asset terminal 400b, the master asset terminal 400a includes the relative location generation module 440a identically to the slave asset terminal 400b to be described below.

The first communication module 410a receives a signal in a GPS frequency band (hereinafter referred to as a GPS signal). The GPS signals received by the first communication module 410a are transmitted to the asset location generation module 420a.

The asset location generation module 420a generates an asset location corresponding to the current location of the asset 10 based on the GPS signals transmitted from the first communication module 410a in response to an asset location generation request of the control module 450a. Here, since the generation of the location information using the GPS signals is a common technology, a detailed description thereof will be omitted.

The asset location generation module 420a generates a first location information transmission request including the asset location and a unique identifier of the asset terminal 400a. The asset location generation module 420a transmits the first location information transmission request to the control module 450a.

The second communication module 430a transmits and receives a signal in a UWB frequency band (hereinafter referred to as a UWB signal). The second communication module 430a transmits and receives the UWB signals to and from the slave asset terminals 400b belonging to the same group.

The second communication module 430a transmits and receives the UWB signals to and from the second communication module 430b of the slave asset terminal 400b. To this end, the second communication module 430a outputs an advertising signal or a location measurement request signal.

The second communication module 430a transmits a first UWB pulse to the asset terminal 400b in response to a ranging request signal of the slave asset terminal 400b. The second communication module 430a receives a second UWB pulse from the slave asset terminal 400b in response to the first UWB pulse. The second communication module 430a calculates a delay time between the first UWB pulse and the second UWB pulse. Measurement information including a unique identifier and a delay time of the slave asset terminal 400b is generated and transmitted to the control module 450a.

The control module 450a transmits an asset location generation request to the asset location generation module 420a. The control module 450a receives the first location information, which is location information generated based on the GPS signals, in response to the asset location generation request.

The control module 450*a* transmits a location information collection request to the third communication module 460*a*. The control module 450*a* receives first location information and second location information that are a response to the location information collection request from the third communication module 460*a*.

The control module 450*a* generates a location information transmission request including the first location information received from the asset location generation module 420*a*, and the first location information and the second location information received from the slave asset terminals 400*b*. At this time, the control module 450*a* may generate a first location information transmission request including the first location information and a second location information transmission request including the second location information. The control module 450*a* transmits the location information transmission request to the third communication module 460*a*.

The third communication module 460*a* transmits a relative location transmission request to the plurality of slave asset terminals 400*b* belonging to the same group in response to the request of the control module 450*a*. The third communication module 460*a* receives the second location information in response to the relative location transmission request. At this time, the third communication module 460*a* receives the second location information including the unique identifier and the relative location of the slave asset terminal 400*b*. The third communication module 460*a* transmits the received second location information to the control module 450*a*.

The third communication module 460*a* transmits the first location information (asset locations of the master asset terminal 400*a* and the slave asset terminal 400*b*) and the second location information to the management server 500 in response to the location information transmission request of the control module 450*a*. The third communication module 460*a* converts the first location information and the second location information into a Sigfox protocol and transmits the converted first and second location information to the management server 500.

Figure 16:
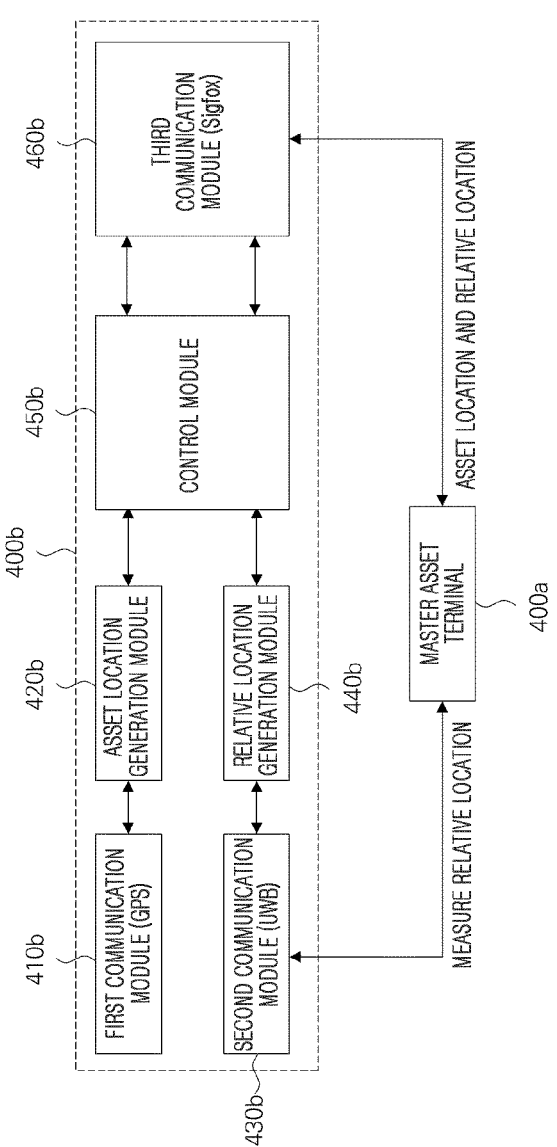
FIG. 16 is a view for describing a slave asset terminal in FIG. 14.

Referring to FIG. 16, the slave asset terminal 400*b* includes a first communication module 410*b*, an asset location generation module 420*b*, a second communication module 430*b*, a relative location generation module 440*b*, a control module 450*b*, and a third communication module 460*b*. Here, as an example, the first communication module 410*b* is a GPS communication module for receiving GPS signals from satellites, the second communication module 430*b* is a UWB communication module for communicating with the slave asset terminal 400*b* belonging to the same group, and the third communication module 460*b* is a Sigfox communication module for communicating with the management server 500 and the slave asset terminal 400*b* belonging to the same group through low-power communication.

The first communication module 410*b* receives a signal in a GPS frequency band (hereinafter referred to as a GPS signal). The GPS signals received by the first communication module 410*b* are transmitted to the asset location generation module 420*b*.

The asset location generation module 420*b* generates an asset location corresponding to the current location of the asset 10 based on the GPS signals transmitted from the first communication module 410*b* in response to an asset location generation request of the control module 450*b*. Here, since the generation of the location information using the GPS signals is a common technology, a detailed description thereof will be omitted.

The asset location generation module 420*b* generates a first location information transmission request including the asset location and a unique identifier of the slave asset terminal 400*b*. The asset location generation module 420*b* transmits the first location information transmission request to the control module 450*b*.

The second communication module 430*b* transmits and receives a signal in a UWB frequency band (hereinafter referred to as a UWB signal). The second communication module 430*b* transmits and receives UWB signals to and from the master asset terminal 400*a* belonging to the same group and transmits the received information to the relative location generation module 440*b*.

The relative location generation module 440*b* transmits a measurement request requesting the measurement of the relative location to the second communication module 430*b* in response to the asset location generation request of the control module 450*b*. The relative location generation module 440*b* receives a delay time from the second communication module 430*b* and based on this, generates the relative location of the slave asset terminal 400*b* based on the reference module. At this time, the relative location generation module 440*b* generates the relative location through measurement technologies such as time difference of arrival (TDoA) and two way ranging (TWR).

The relative location generation module 440*b* generates second location information including a relative location, a unique identifier of the master asset terminal 400*a*, and a unique identifier of the slave asset terminal 400*b*. The relative location generation module 440*b* transmits the second location information to the control module 450*b*.

The control module 450*b* transmits the asset location generation request to the asset location generation module 420*b* and the relative location generation module 440*b*. The control module 450*b* receives the first location information and the second location information in response to the asset location generation request. The control module 450*b* receives the first location information, which is location information generated based on the GPS signals, from the asset location generation module 420*b*. The control module 450*b* receives the second location information, which is relative location information generated based on the UWB signals, from the relative location generation module 440*b*.

The control module 450*b* generates a location information transmission request including the first location information and the second location information. At this time, the control module 450*b* may generate a first location information transmission request including the first location information and a second location information transmission request including the second location information. The control module 450*b* transmits the location information transmission request to the third communication module 460*b*.

The third communication module 460*b* transmits the first location information and the second location information to the master asset terminal 400*a* in response to the location information transmission request of the control module 450*b*. The third communication module 460*b* converts the first location information and the second location information into a Sigfox protocol and transmits the converted first and second location information to the master asset terminal 400*a*.

The management server 500 collects location information from the master asset terminal 400*a* of each group. At this time, the management server 500 collects the asset location of the master asset terminal 400*a* belonging to the group, and the asset locations and the relative locations of the slave asset terminals 400*b*. The management server 500 corrects the asset location using the relative location for each group and outputs a corrected asset location generated as a result of the correction.

Figure 17:
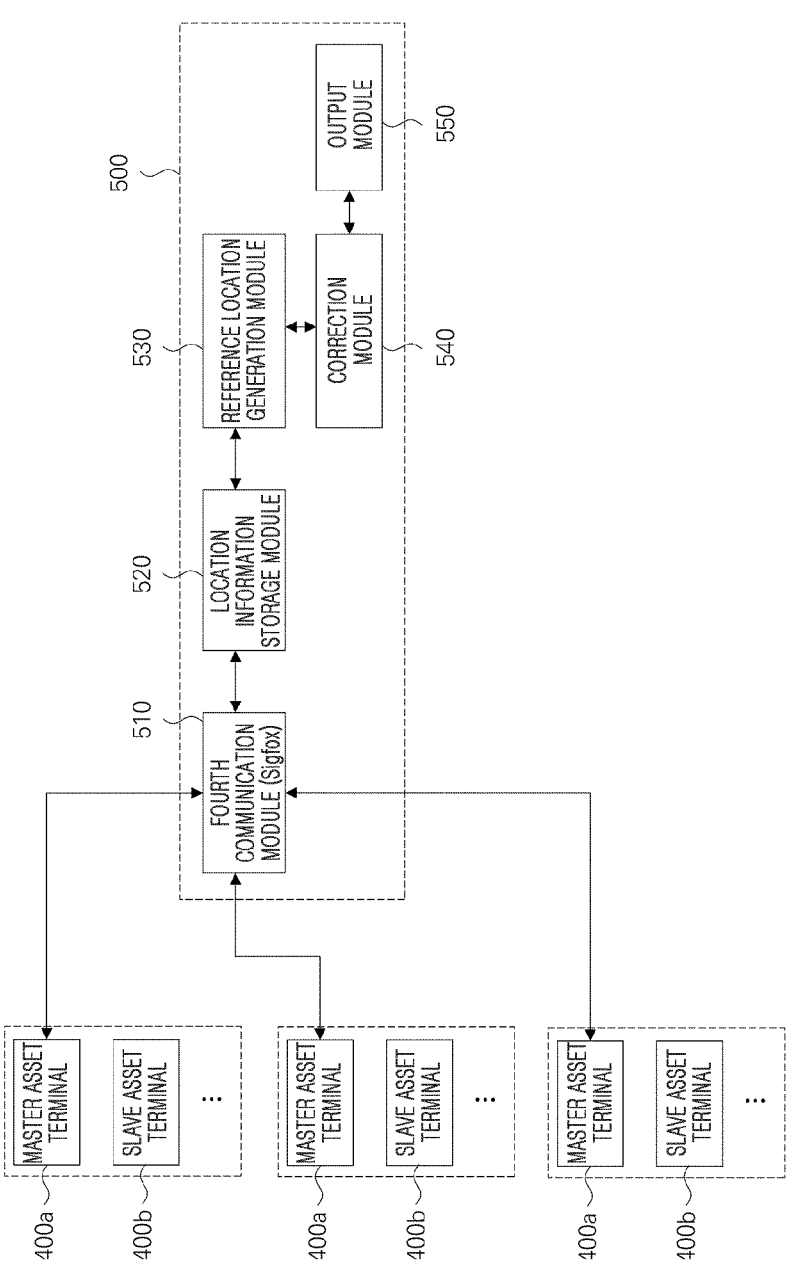
FIG. 17 is a view for describing a configuration of the management server in FIG. 14.

To this end, referring to FIG. 17, the management server 500 includes a fourth communication module 510, a location information storage module 520, a reference location generation module 530, a correction module 540, and an output module 550.

The fourth communication module 510 receives the first location information and the second location information from the plurality of asset terminals 400*a* and 400*b*. The fourth communication module 510 receives the first location information including the unique identifier and the asset location of the master asset terminal 400*a* and/or the unique identifier and the asset location of the slave asset terminal 400*b*. The fourth communication module 510 receives the second location information including the unique identifier and the relative location of the slave asset terminal 400*b* and the unique identifier of the master asset terminal 400*a*. The fourth communication module 510 transmits a location information storage request including the first location information and the second location information to the location information storage module 520.

The location information storage module 520 stores the first location information and the second location information in response to a location information storage request of the fourth communication module 510. At this time, referring to FIG. 18, the location information storage module 520 stores the first location information and the second location information in conjunction with the unique identifier and the asset location of the master asset terminal 400*a*. The location information storage module 520 stores the first location information and the second location information in conjunction with the unique identifier of the slave asset terminal 400*b*, the unique identifier of the master asset terminal 400*a*, the asset location, and the relative location.

The location information storage module 520 detects a unique identifier and a reference location from the reference location storage request in response to a reference location storage request of the reference location generation module 530. The location information storage module 520 stores the reference location in conjunction with the unique identifier of the slave asset terminal 400*b*, which is the same as the detected unique identifier.

The location information storage module 520 detects a unique identifier and a corrected asset location from the asset location storage request in response to an asset location storage request of the correction module 540. The location information storage module 520 stores the corrected asset location in conjunction with the unique identifier of the slave asset terminal 400*b*, which is the same as the detected unique identifier.

The reference location generation module 530 generates the reference location of the reference terminal 400*b* based on the asset locations and the relative locations stored in the location information storage module 520.

The reference location generation module 530 detects information connected to the unique identifier of the same master asset terminal 400*a* from the location information storage module 520. The reference location generation module 530 detects the unique identifier, the asset location, and the relative location of the asset terminal 400 connected to the unique identifier of the same master asset terminal 400*a*.

The reference location generation module 530 extracts a midpoint of two asset terminals 400 located at facing points based on the master asset terminal 400*a*. At this time, the reference location generation module 530 detects a location of each asset terminal 400 moved in a direction of the relative location from the asset location by a distance of the relative location. The reference location generation module 530 extracts a ½ point of a straight line connecting the locations of the two asset terminals 400 located at the facing points among the detected locations as a midpoint.

Meanwhile, the reference location generation module 530 may generate the reference location of the master asset terminal 400*a* based on the asset location stored in the location information storage module 520. In other words, the reference location generation module 530 may generate the asset location of the master asset terminal 400*a* as the reference location without performing a separate calculation.

The reference location generation module 530 detects information connected to the unique identifier of the same master asset terminal 400*a* from the location information storage module 520. The reference location generation module 530 detects the unique identifier and the asset location of the asset terminal 400 connected to the unique identifier of the same master asset terminal 400*a*.

The reference location generation module 530 extracts a midpoint of two asset terminals 400 located at facing points based on the master asset terminal 400*a*. At this time, the reference location generation module 530 extracts a ½ point of a straight line connecting the asset locations of the two asset terminals 400 located at the facing points based on the master asset terminal 400*a* as a midpoint.

When the extraction of the midpoints is finished, the reference location generation module 530 extracts a center point of a figure connecting the midpoints and generates the extracted center point as the reference location (i.e., the location of the master asset terminal 400*a*). The reference location generation module 530 generates a reference location storage request including the unique identifier and the reference location of the master asset terminal 400*a* and transmits the reference location storage request to the location information storage module 520. The reference location generation module 530 transmits a location correction request including the unique identifier and the reference location of the master asset terminal 400*a* to the correction module 540.

The correction module 540 generates a corrected asset location in response to the location correction request of the reference location generation module 530. In other words, the correction module 540 detects the unique identifier and the reference location of the master asset terminal 400*a* from the location correction request. The correction module 540 detects the unique identifier and the relative location of the asset terminal 400 connected to the unique identifier of the master asset terminal 400*a* from the location information storage module 520. The correction module 540 sets the reference location as a reference point and generates the corrected asset location of each asset terminal 400 by reflecting the relative location and arranging the asset terminal 400. The correction module 540 generates an asset location storage request including the unique identifier of the asset terminal 400 and the corrected asset location and transmits the asset location storage request to the location information storage module 520. The correction module 540 generates an asset 10 output request and transmits the asset output request to the output module 550.

The output module 550 outputs the master asset terminal 400a and the plurality of asset terminals 400a and 400b on a screen in response to the output request of the correction module 540. At this time, the output module 550 outputs a screen on which the master asset terminal 400a is displayed at the reference location and the asset terminal 400 is displayed at the corrected asset location.

An example in which the management server 500 corrects the locations of the asset terminals 400a and 400b will be described with reference to FIGS. 19 to 24 as follows.

Figure 19:
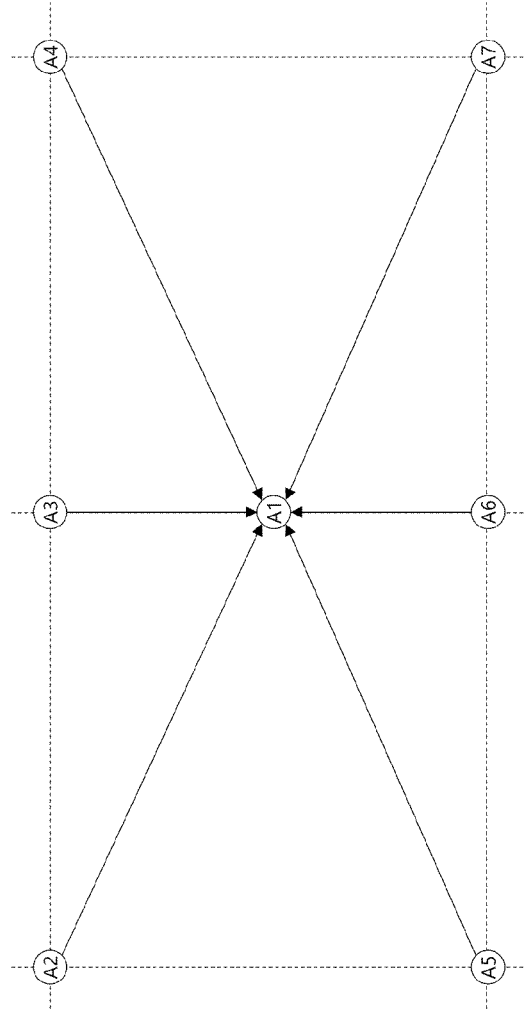
FIGS. 19 to 24 are views for describing an example in which the management server in FIG. 14 tracks (corrects) the location of the asset terminal.

First, as illustrated in FIG. 19, an example in which the first asset terminal A1 to the seventh asset terminal A7 are in a state of being stored in the yard, the first asset terminal A1 is set to the master asset terminal 400a, and the second asset terminal A2 to the seventh asset terminal A7 are set to the slave asset terminal 400b will be described.

The second asset terminal A2 and the seventh asset terminal A7 are located at facing points based on the master asset terminal A1, the third asset terminal A3 and the sixth asset terminal A6 are located at facing points based on the master asset terminal A1, and the fourth asset terminal A4 and the fifth asset terminal A5 are located at facing points based on the master asset terminal A1.

Figure 20:
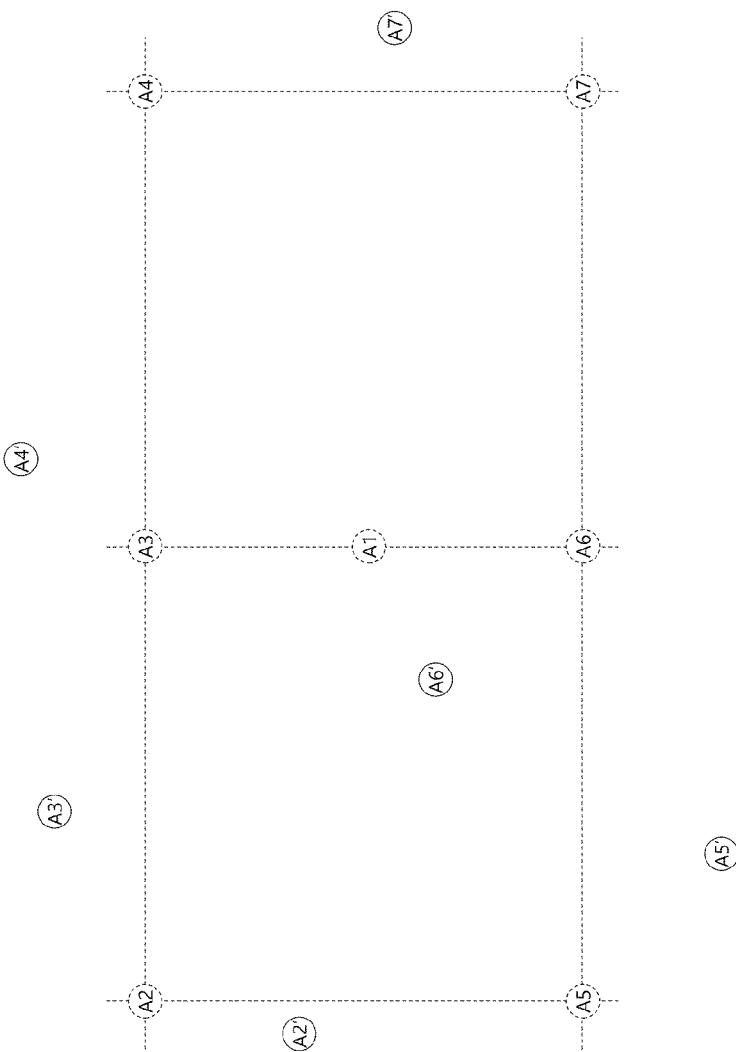

Referring to FIG. 20, since asset locations A2' to A7' collected from the asset terminal 400 are generated based on the GPS signals, the asset locations A2' to A7' are displayed differently from actual locations, and the relative locations between the asset terminals 400 are also displayed differently from the actual locations.

To correct this, the management server 500 sets a reference location corresponding to the location of the master asset terminal 400a.

Figure 21:
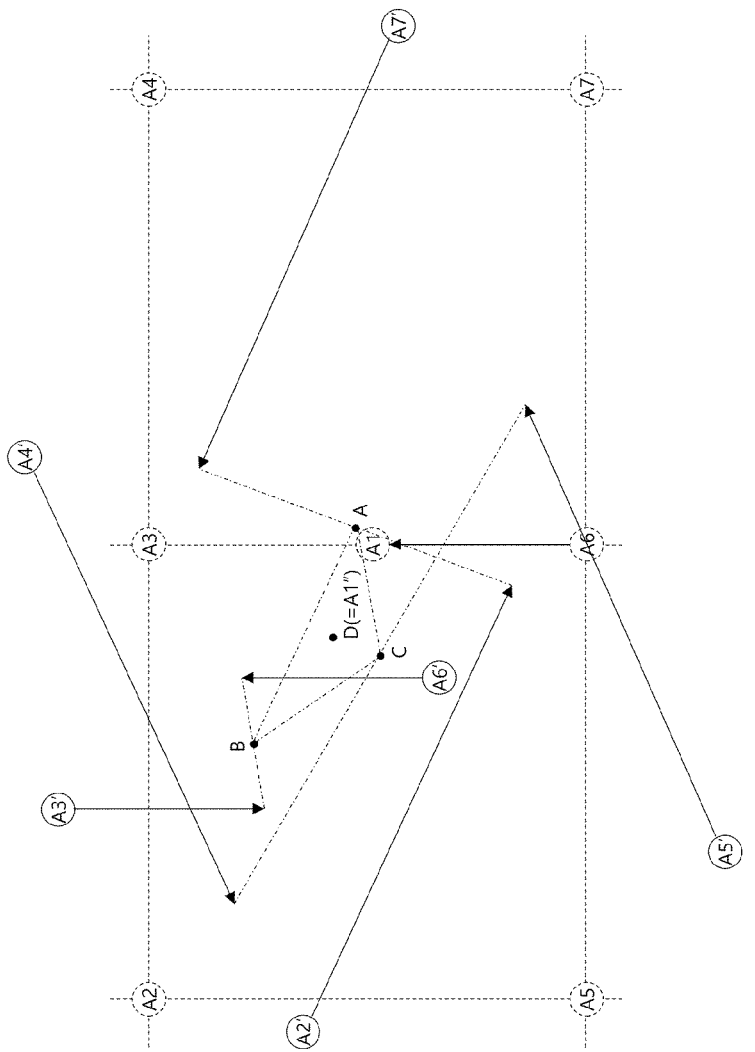

Referring to FIG. 21, the management server 500 detects a location of each asset terminal 400 moved in a direction of the relative location by a distance of the relative location from an asset location as the asset location.

The management server 500 extracts a ½ point of a straight line connecting asset locations of two asset terminals 400 located at facing points based on the master asset terminal 400a as a midpoint. At this time, A, which is a center point of the second asset terminal A2 and the seventh asset terminal A7, B, which is a center point of the third asset terminal A3 and the sixth asset terminal A6, and C, which is a center point of the fourth asset terminal A4 and the fifth asset terminal A5, are extracted.

The management server 500 extracts a center point D of a triangle formed by connecting the extracted midpoints A, B, and C and generates the center point D as a reference location A1" (i.e., a location of the master asset terminal 400a).

Figure 22:
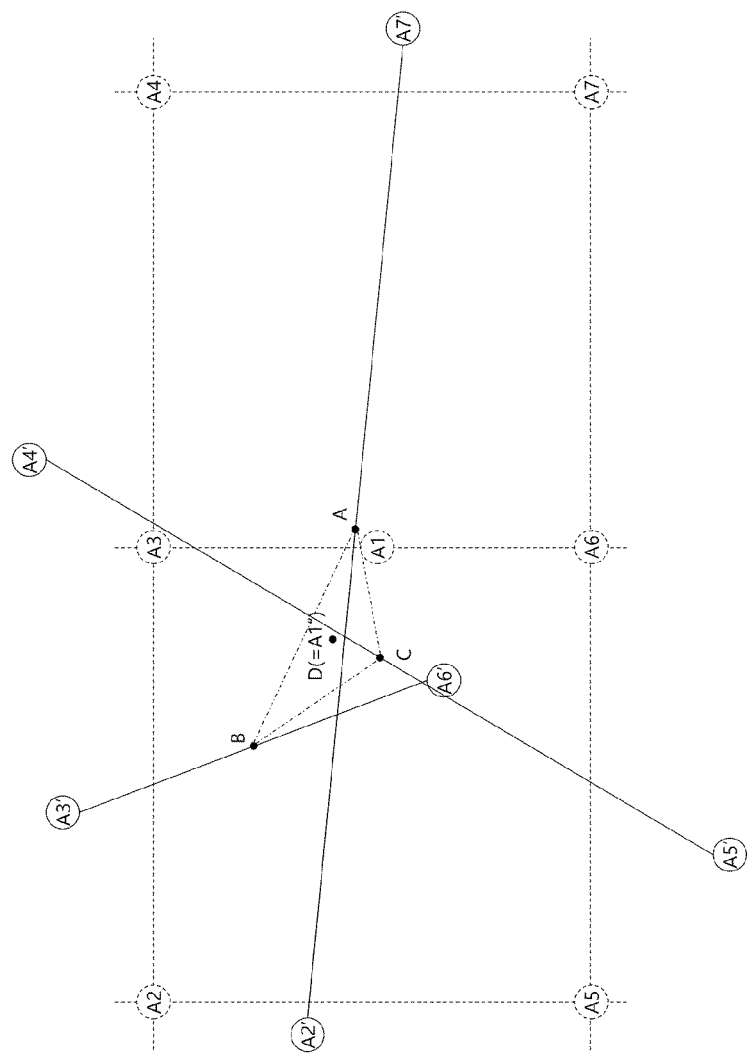

Meanwhile, referring to FIG. 22, the management server 500 may extract ½ points of straight lines connecting asset locations (asset locations not reflecting the relative location) of two asset terminals 400 located at the facing points based on the master asset terminal 400a as midpoints A, B, and C.

Figure 23:
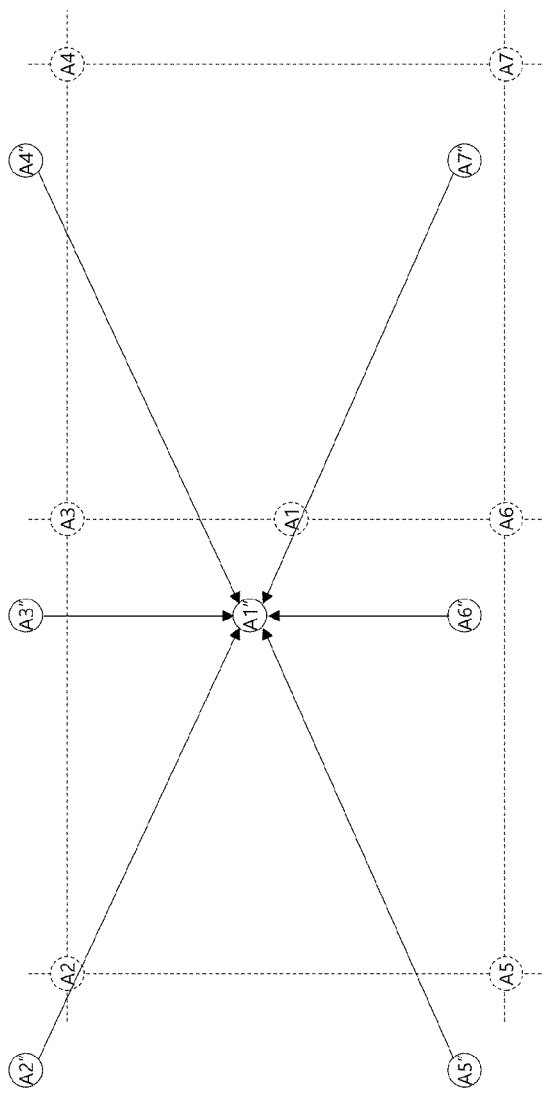

Referring to FIG. 23, the management server 500 sets the reference location A1" to the location of the master asset terminal 400a and generates corrected asset locations A2" to A7" of the asset terminals 400 by reflecting the relative location of the asset terminal 400 based on the reference location A1" and arranging each asset terminal 400.

Figure 24:
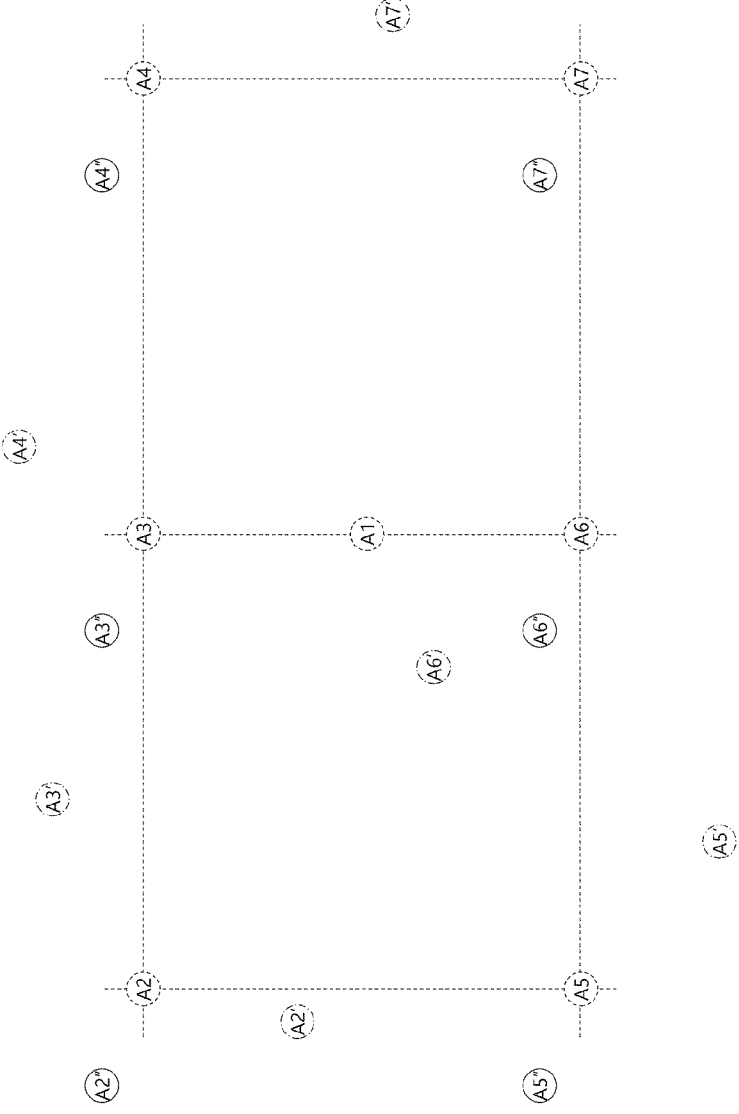

Therefore, as illustrated in FIG. 24, the corrected asset locations A2" to A7" generated by the management server 500 may have a reduced error compared to the asset locations A2' to A7' measured based on the GPS signals, and errors with the actual locations A2 to A7 occurs but the relative locations based on the master asset terminal 400a may be displayed identically, and thus it is possible to increase the accuracy of the asset tracking.

Hereinafter, an asset tracking method according to an embodiment of the present disclosure will be described with reference to the accompanying drawings.

Figure 25:
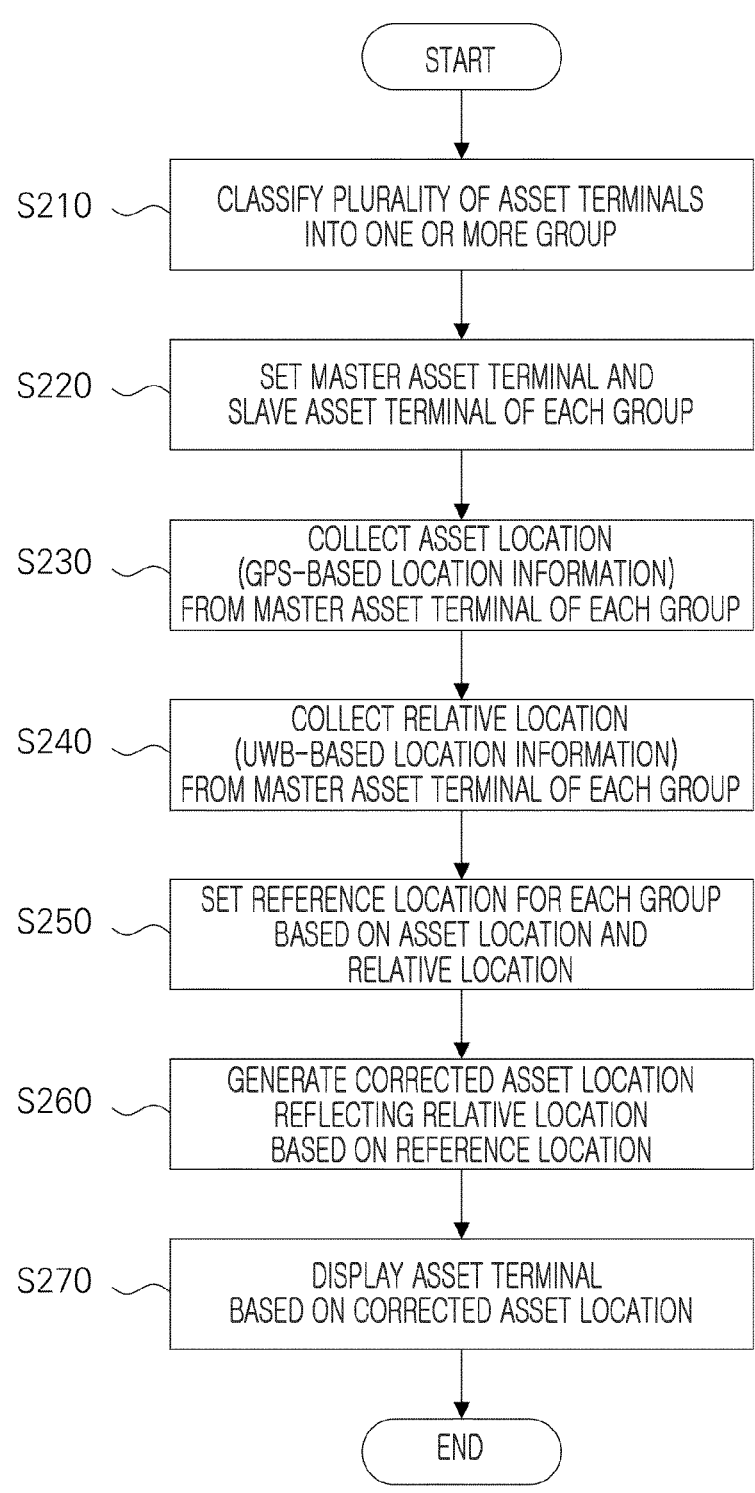
FIG. 25 is a flowchart for describing an asset tracking method according to the second embodiment of the present disclosure.

Referring to FIG. 25, the plurality of slave asset terminals 400b form one or more groups through mutual communication (S210). In this case, as an example, the plurality of slave asset terminals 400b measure relative distances through UWB communication therebetween and form one or more groups based on the relative distances.

One of the slave asset terminals 400b belonging to each group is set to the master asset terminal 400a, and the remainder is set to the slave asset terminals 400b (S220). In this case, as an example, the asset terminals 400a and 400b set the master asset terminal 400a in consideration of the remaining battery capacity, a communication range, quality, and the like.

The management server 500 collects the asset location, which is the GPS-based location information, from the master asset terminal 400a of each group (S230). The plurality of slave asset terminals 400b measure the asset location based on the GPS signals and transmit the measured asset location to the master asset terminal 400a belonging to the same group. The master asset terminal 400a of each group transmits the asset location to the management server 500 at the request of the management server 500. The management server 500 stores the asset locations received from the master asset terminal 400a. At this time, the management server 500 stores the asset locations in conjunction with the unique identifier and the asset location of the slave asset terminal 400b.

The management server 500 collects the relative location, which is the UWB-based location information, from the master asset terminal 400a of each group (S240). The master asset terminal 400a performs UWB communication with the slave asset terminals 400b of the same group to measure the relative location of the slave asset terminal 400b based on the master asset terminal 400a and transmits the relative location to the management server 500 according to the request of the management server 500. The management server 500 stores the relative location received from the master asset terminal 400a. At this time, the management server 500 stores the relative location in conjunction with the unique identifier and the relative location of the slave asset terminal 400b and the unique identifier of the master asset terminal 400a.

The management server 500 sets the reference location based on the asset location and the relative location (S250).

Figure 26:
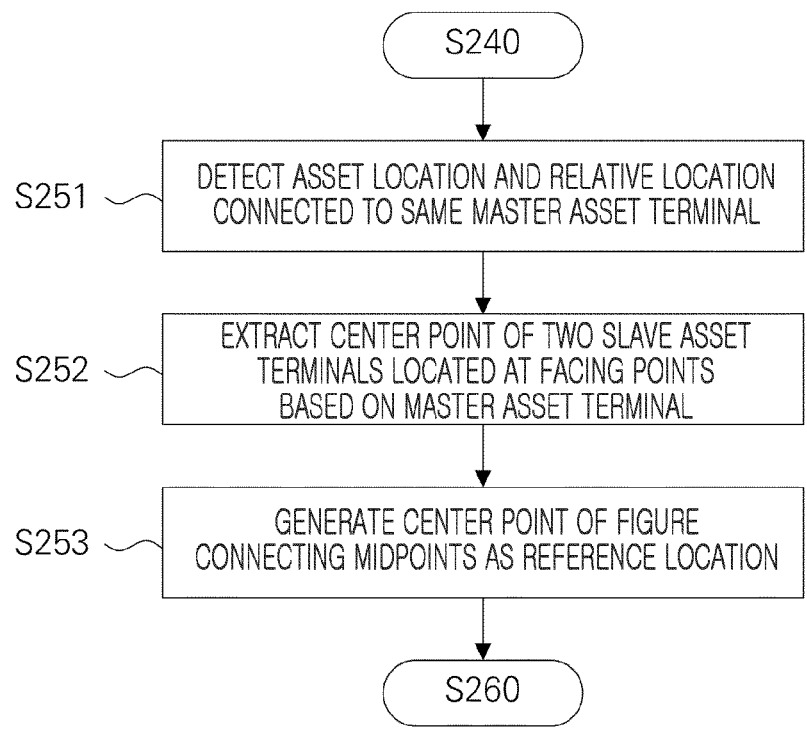
FIG. 26 is a flowchart for describing setting a reference location in FIG. 25.

Referring to FIG. 26, the management server 500 detects the asset location and the relative location connected to the same master asset terminal 400a (i.e., the unique identifier of the master asset terminal 400a) among the stored asset location and relative locations (S251).

The management server 500 extracts the midpoint of the two asset terminals 400b located at the facing points based on the master asset terminal 400a (S252). At this time, the management server 500 detects a location of each slave asset terminal 400b moved in a direction of the relative location from the asset location by the distance of the relative location. The reference location generation module 530 extracts a ½ point of a straight line connecting the locations of the two slave asset terminals 400b located at the facing points among the detected locations as a midpoint.

Meanwhile, in operation S320, the management server 500 may extract the midpoint using only the asset location. In other words, the management server 500 detects the unique identifier and the asset location of the slave asset terminal 400b connected to the unique identifier of the same master asset terminal 400a. The management server 500 extracts the midpoint of the two slave asset terminals 400b located at the facing points based on the master asset terminal 400a. At this time, the management server 500 extracts a ½ point of a straight line connecting asset locations of two slave asset terminals 400b located at facing points based on the master asset terminal 400a as a midpoint.

The management server 500 extracts the center point of the figure connecting the midpoints detected in operation S252 and generates the center point as the reference location (i.e., the location of the master asset terminal 400a) (S253). The management server 500 stores the reference location in conjunction with the unique identifier of the master asset terminal 400a.

The management server 500 generates the corrected asset location by reflecting the relative location based on the reference location set in operation S250 (S260). The management server 500 detects the unique identifier and the asset location of the slave asset terminal 400b connected to the unique identifier of the same master asset terminal 400a. The management server 500 sets the reference location to the reference point and generates the corrected asset location of each slave asset terminal 400b by reflecting the relative location and arranging the slave asset terminal 400b. The management server 500 stores the unique identifier and the corrected asset location of the slave asset terminal 400b in conjunction with each other.

The management server 500 displays the master asset terminal 400a and the slave asset terminal 400b based on the stored corrected asset location (S270). In other words, the management server 500 outputs the master asset terminal 400a and the plurality of slave asset terminals 400b on the screen, displays the master asset terminal 400a at the reference location, and displays the slave asset terminal 400b at the corrected asset location.

Meanwhile, when the asset terminal set to the master asset terminal 400a in operation S220 continuously operates as the master asset terminal 400a, the battery efficiency of the corresponding asset terminal is inevitably degraded. Therefore, the plurality of asset terminals 400a and 400b change the master asset terminal 400a to another asset terminal depending on GPS communication quality, UWB communication quality, the remaining battery level, or the like. In other words, one of the slave asset terminals 400b is set to a new master asset terminal 400a, and the current master asset terminal 400a is changed to the slave asset terminal 400b.

Therefore, the asset tracking method according to the embodiment of the present disclosure can reduce errors compared to the asset locations measured based on the GPS signals, and some errors with the actual locations occur but the relative locations based on the master asset terminal 400a may be displayed identically, and thus it possible to increase the accuracy of the asset tracking.

In a third embodiment of the present disclosure, relative locations between assets may be accurately tracked by classifying a plurality of asset terminals into groups, setting a location of a master asset terminal of each group to a reference location, and setting an asset location using a relative location of a slave asset terminal. In this case, an asset tracking system and method according to the third embodiment of the present disclosure may drive a GPS communication module of the master asset terminal and stop driving of the GPS communication module of the slave asset terminals to extend a location trackable period of the asset loaded for a long time.

In other words, in the third embodiment of the present disclosure, after a plurality of asset terminals are divided into a plurality of groups through UWB communication, one of asset terminals belonging to each group is set to the master asset terminal, and the remaining asset terminals are set to the slave asset terminal. The master asset terminal measures the relative location with the slave asset terminal through UWB communication and transmits the location information measured at set time intervals to the management server. Therefore, the asset tracking system identifies the relative arrangement of the same assets as the actual arrangement.

Figure 27:
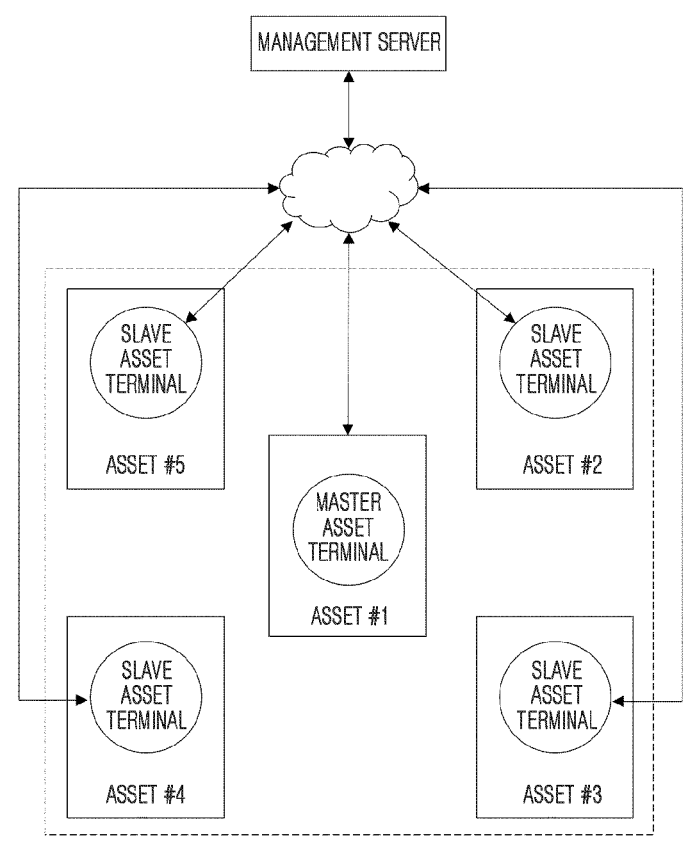
FIG. 27 is a view for describing the conventional asset tracking system.

Referring to FIG. 27, in the conventional asset tracking system, a plurality of asset terminals each measure an asset location and transmit the measured asset location to a management server. In this case, in order for the asset terminal to measure the asset location and transmit the measured asset location to the management server, a GPS module and a low-power communication module should be maintained in a constant driving state, and thus the efficiency of a battery mounted in the asset terminal is inevitably degraded.

In addition, when the asset is loaded for a long time, the asset terminal may not measure the location of the asset due to the degradation in battery efficiency.

Therefore, in the asset tracking system and method according to the embodiment of the present disclosure, a plurality of asset terminals are divided into a plurality of groups, one of the asset terminals belonging to each group is set to a master asset terminal, and the remaining asset terminals are set to a slave asset terminal.

The master asset terminal measures the asset location based on GPS communication, transmits the asset location to the management server, collects relative locations based on UWB communication from the slave asset terminals, and transmits the relative locations to the management server. At this time, the slave asset terminals stop measuring the asset location through GPS communication and measure the relative locations based on the master asset terminal through UWB communication with the master asset terminal.

The management server may set the master asset terminal to a reference, and accurately identify the relative locations of the assets by reflecting the relative locations of the slave asset terminals and arranging the slave asset terminals.

Figure 28:
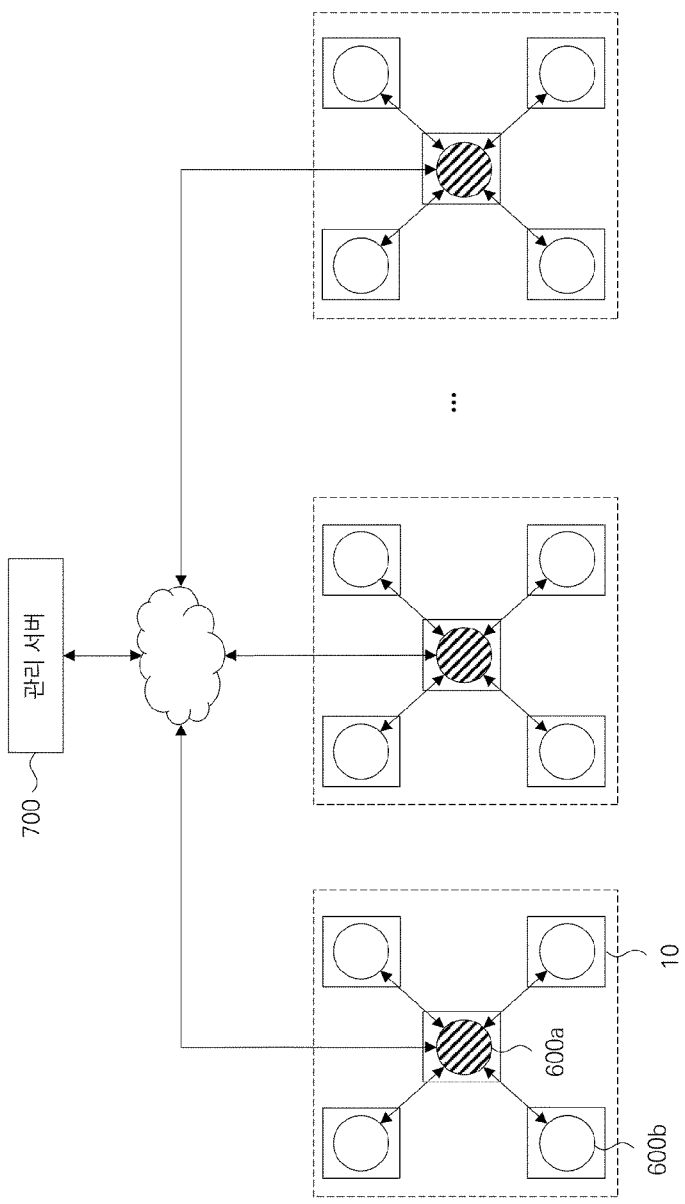
FIG. 28 is a view for describing an asset tracking system according to a third embodiment of the present disclosure.

To this end, referring to FIG. 28, the asset tracking system includes a plurality of asset terminals 600a and 600b and a management server 700.

The plurality of asset terminals 600a and 600b are communication terminals each mounted (or installed) on the asset 10 for asset 10 management. The plurality of asset terminals 600a and 600b are divided into a plurality of groups reflecting a communication range, a location, and the like. In this case, the plurality of asset terminals 600a and 600b communicate with each other through UWB communication to generate relative locations and form one or more groups based on this.

The group formed as described above includes the two or more asset terminals 600a and 600b. One of the asset terminals 600a and 600b belonging to the same group operates as the master asset terminal 600a, which is the reference of the asset tracking, and the remaining asset terminals operate as the slave asset terminals 600b. In other words, the plurality of asset terminals 600a and 600b are divided into one or more groups, and each group includes one master asset terminal 600*a* and the plurality of slave asset terminals 600*b*.

The master asset terminal 600*a* generates the asset location through GPS communication and generates the relative location of the asset 10 in which the slave asset terminal 600*b* is installed through UWB communication with the slave asset terminals 600*b* belonging to the same group. Here, the relative location is a relative location of the slave asset terminal 600*b* based on the location of the master asset terminal 600*a*, and the relative location may include a direction and a distance.

The master asset terminal 600*a* transmits location information to the management server 700 at set time intervals or at the request of the management server 700. At this time, the master asset terminal 600*a* transmits location information including the asset location, which is the location of the asset 10 in which the master asset terminal 600*a* is installed, and the relative locations of the assets 10 in which the slave asset terminal 600*b* is installed to the management server 700.

Meanwhile, when one asset terminal continuously operates as the master asset terminal 600*a*, the battery efficiency of the corresponding asset terminal is inevitably degraded. Therefore, the plurality of asset terminals 600*a* and 600*b* change the master asset terminal 600*a* to another asset terminal depending on GPS communication quality, UWB communication quality, the remaining battery level, or the like. In other words, one of the slave asset terminals 600*b* is set to a new master asset terminal 600*a*, and the current master asset terminal 600*a* is changed to the slave asset terminal 600*b*.

Figure 29:
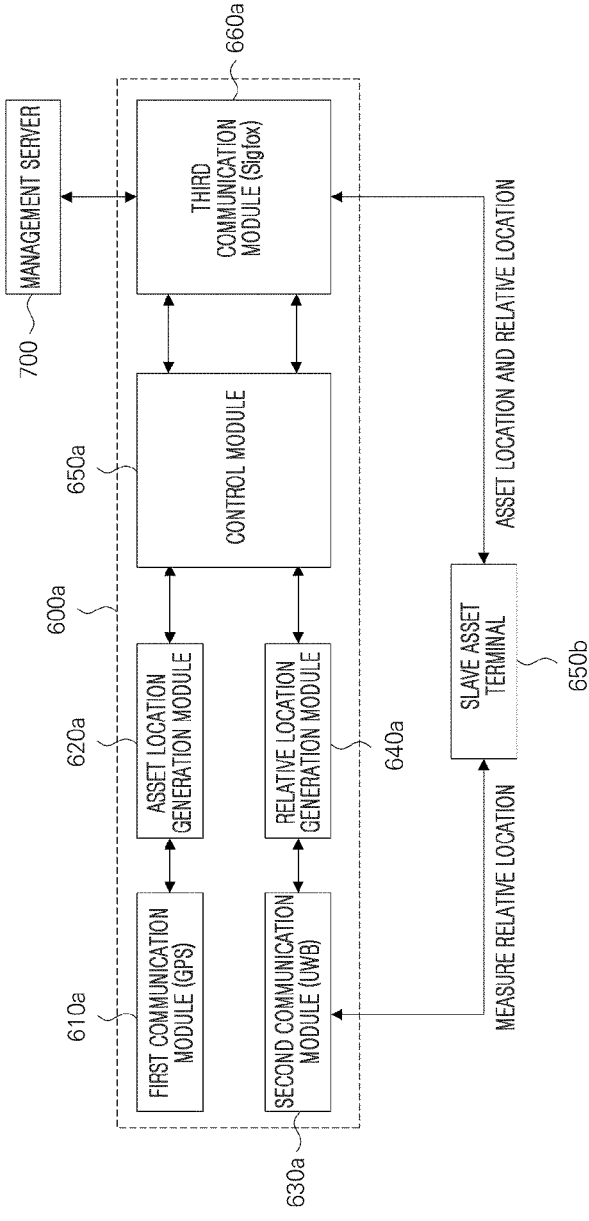
FIG. 29 is a view for describing a master asset terminal in FIG. 28.

Referring to FIG. 29, the master asset terminal 600*a* includes a first communication module 610*a*, an asset location generation module 620*a*, a second communication module 630*a*, a relative location generation module 640*a*, a control module 650*a*, and a third communication module 660*a*. Here, as an example, the first communication module 610*a* is a GPS communication module for receiving GPS signals from satellites, the second communication module 630*a* is a UWB communication module for communicating with the slave asset terminal 600*b* belonging to the same group, and the third communication module 660*a* is a Sigfox communication module for communicating with the management server 700 and the slave asset terminal 600*b* belonging to the same group through low-power communication.

In this case, since the master asset terminal 600*a* is the reference for relative location measurement, the relative location generation module does not perform a separate operation. However, since the master asset terminal 600*a* may later be changed to the slave asset terminal 600*b*, the master asset terminal 400*a* includes the relative location generation module 640*a* identically to the slave asset terminal 600*b* to be described below.

The first communication module 610*a* receives a signal in a GPS frequency band (hereinafter referred to as a GPS signal). The GPS signals received by the first communication module 610*a* are transmitted to the asset location generation module 620*a*.

The asset location generation module 620*a* generates an asset location corresponding to the current location of the asset 10 based on the GPS signals transmitted from the first communication module 610*a* in response to an asset location generation request of the control module 650*a*. Here, since the generation of the location information using the GPS signals is a common technology, a detailed description thereof will be omitted.

The asset location generation module 620*a* generates a first location information transmission request including the asset location and a unique identifier of the asset terminal 600*a*. The asset location generation module 620*a* transmits the first location information transmission request to the control module 650*a*.

The second communication module 630*a* transmits and receives a signal in a UWB frequency band (hereinafter referred to as a UWB signal). The second communication module 630*a* transmits and receives the UWB signals to and from the slave asset terminals 600*b* belonging to the same group.

The second communication module 630*a* transmits and receives the UWB signals to and from the second communication module 630*b* of the slave asset terminal 600*b*. To this end, the second communication module 630*a* outputs an advertising signal or a location measurement request signal.

The second communication module 630*a* transmits a first UWB pulse to the asset terminal 600*b* in response to a ranging request signal of the slave asset terminal 600*b*. The second communication module 630*a* receives a second UWB pulse from the slave asset terminal 600*b* in response to the first UWB pulse. The second communication module 630*a* calculates a delay time between the first UWB pulse and the second UWB pulse. Measurement information including a unique identifier and a delay time of the slave asset terminal 600*b* is generated and transmitted to the control module 650*a*.

The control module 650*a* transmits an asset location generation request to the asset location generation module 620*a*. The control module 650*a* receives the first location information, which is location information generated based on the GPS signals, in response to the asset location generation request.

The control module 650*a* transmits a location information collection request to the third communication module 660*a*. The control module 650*a* receives second location information that is a response to the location information collection request from the third communication module 660*a*.

The control module 650*a* generates a location information transmission request including the first location information received from the asset location generation module 620*a*, and the second location information received from the slave asset terminals 600*b*. At this time, the control module 650*a* may generate a first location information transmission request including the first location information and a second location information transmission request including the second location information. The control module 650*a* transmits the location information transmission request to the third communication module 660*a*.

The third communication module 660*a* transmits a relative location transmission request to the plurality of slave asset terminals 600*b* belonging to the same group in response to the request of the control module 650*a*. The third communication module 660*a* receives the second location information in response to the relative location transmission request. At this time, the third communication module 660*a* receives the second location information including the unique identifier and the relative location of the slave asset terminal 600*b*. The third communication module 660*a* transmits the received second location information to the control module 650*a*.

The third communication module 660*a* transmits the first location information (i.e., the asset location of the master asset terminal 600*a*) and the second location information (i.e., the relative location of the slave asset terminal 600*b*) to the management server 700 in response to the location information transmission request of the control module 650*a*. The third communication module 660*a* converts the first location information and the second location information into a Sigfox protocol and transmits the converted first and second location information to the management server 700.

Figure 30:
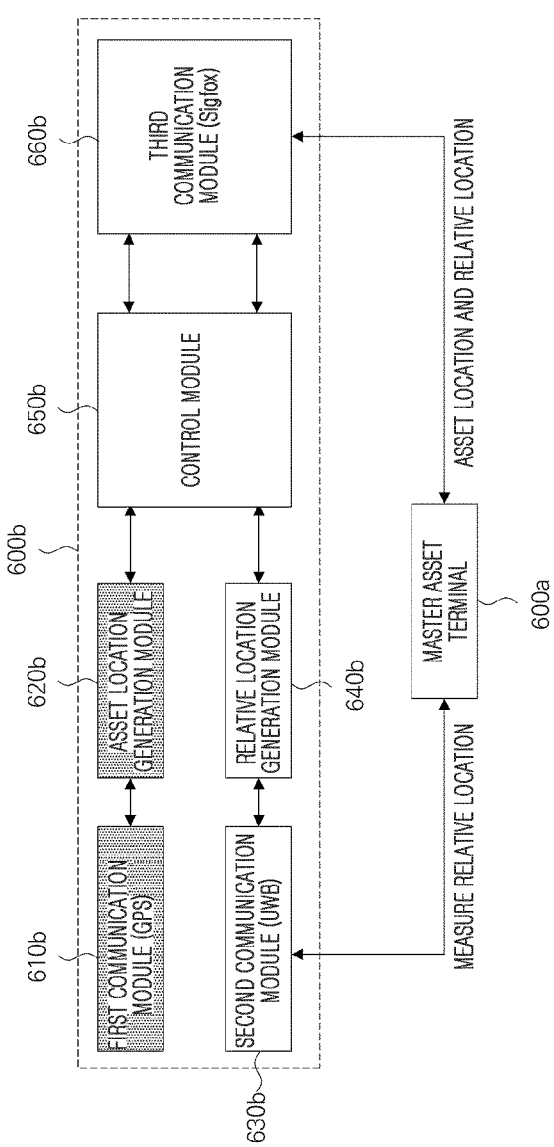
FIG. 30 is a view for describing a slave asset terminal in FIG. 28.

Referring to FIG. 30, the slave asset terminal 600*b* includes a first communication module 610*b*, an asset location generation module 620*b*, a second communication module 630*b*, a relative location generation module 640*b*, a control module 650*b*, and a third communication module 660*b*. Here, as an example, the first communication module 610*b* is a GPS communication module for receiving GPS signals from satellites, the second communication module 630*b* is a UWB communication module for communicating with the slave asset terminal 600*b* belonging to the same group, and the third communication module 660*b* is a Sigfox communication module for communicating with the management server 700 and the slave asset terminal 600*b* belonging to the same group through low-power communication.

The first communication module 610*b* and the asset location generation module 620*b* are set to a sleep mode to stop receiving GPS signals and generating asset locations. In other words, the first communication module 610*b* and the asset location generation module 620*b* stop driving in response to a stop request of the control module 650*b*.

The second communication module 630*b* transmits and receives a signal in a UWB frequency band (hereinafter referred to as a UWB signal). The second communication module 630*b* transmits and receives UWB signals to and from the master asset terminal 600*a* belonging to the same group and transmits the received information to the relative location generation module 640*b*.

The relative location generation module 640*b* transmits a measurement request requesting the measurement of the relative location to the second communication module 630*b* in response to the asset location generation request of the control module 650*b*. The relative location generation module 640*b* receives a delay time from the second communication module 630*b* and based on this, generates the relative location of the slave asset terminal 600*b* based on the reference module. At this time, the relative location generation module 640*b* generates the relative location through measurement technologies such as time difference of arrival (TDoA) and two way ranging (TWR).

The relative location generation module 640*b* generates second location information including a relative location, a unique identifier of the master asset terminal 600*a*, and a unique identifier of the slave asset terminal 600*b*. The relative location generation module 640*b* transmits the second location information to the control module 650*b*.

When the asset terminal is set to the slave asset terminal 600*b*, the control module 650*b* transmits the stop request to the first communication module 610*b* and the asset location generation module 620*b*. In other words, when the asset terminal operates in a slave mode, the control module 650*b* stops the first communication module 610*b* and the asset location generation module 620*b* to prevent unnecessary consumption of a battery built into the asset terminal. At this time, when the asset terminal is changed to a master mode, the control module 650*b* transmits a re-driving request to the first communication module 610*b* and the asset location generation module 620*b*.

The control module 650*b* transmits an asset location generation request to the relative location generation module 640*b*. The control module 650*b* receives second location information generated by the relative location generation module 640*b* in response to the asset location generation request, and the second location information is relative location information generated based on a UWB signal.

The control module 650*b* generates a location information transmission request including the second location information. The control module 650*b* transmits the location information transmission request to the third communication module 660*b*.

The third communication module 660*b* transmits the second location information to the master asset terminal 600*a* in response to the location information transmission request of the control module 650*b*. The third communication module 660*b* converts the second location information into a Sigfox protocol and transmits the converted second location information to the master asset terminal 600*a*.

The management server 700 collects location information from the master asset terminal 600*a* of each group. At this time, the management server 700 collects the asset location of the master asset terminal 600*a* belonging to a group and the relative locations of the slave asset terminals 600*b*. The management server 700 sets the asset location of the master asset terminal 600*a* to a reference for each group, reflects the relative location of each slave asset terminal 600*b*, and arranges the slave asset terminals 600*b*.

Figure 31:
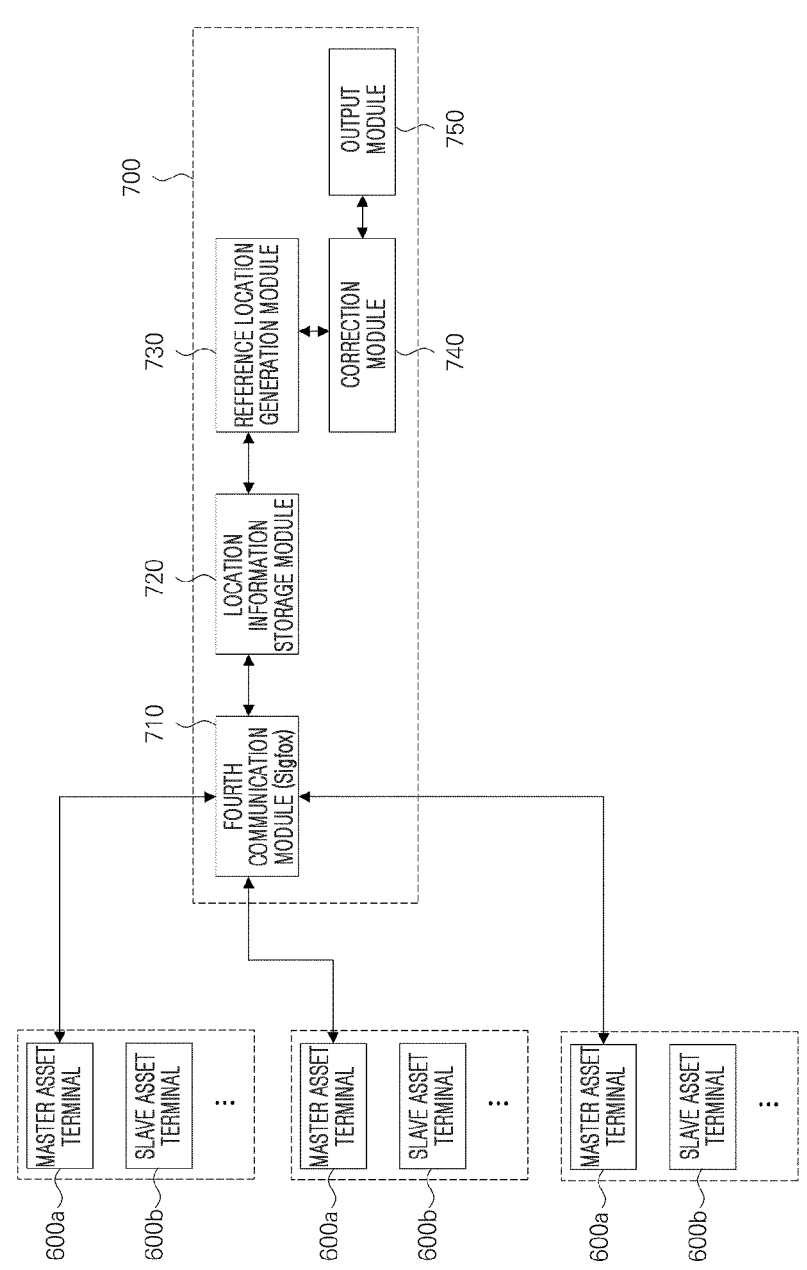
FIG. 31 is a view for describing a configuration of the management server in FIG. 28.

To this end, referring to FIG. 31, the management server 700 includes a fourth communication module 710, a location information storage module 720, a reference location generation module 730, a correction module 740, and an output module 750.

The fourth communication module 710 receives the first location information and the second location information from the plurality of asset terminals 600*a* and 600*b*. The fourth communication module 710 receives the first location information including the unique identifier and the asset location of the master asset terminal 600*a* and the second location information including the unique identifier and the relative location of the slave asset terminal 600*b*. The fourth communication module 710 transmits a location information storage request including the first location information and the second location information to the location information storage module 720.

The location information storage module 720 stores the first location information and the second location information in response to a location information storage request of the fourth communication module 710. At this time, referring to FIG. 32, the location information storage module 720 stores the first location information and the second location information in conjunction with the unique identifier and the asset location of the master asset terminal 600*a*. The location information storage module 720 stores the first location information and the second location information in conjunction with the unique identifier of the slave asset terminal 600*b* and the unique identifier and the relative location of the master asset terminal 600*a*.

The location information storage module 720 detects a unique identifier and a reference location from the reference location storage request in response to a reference location storage request of the reference location generation module 730. The location information storage module 720 stores the reference location in conjunction with the slave asset terminal 600*b* connected with the unique identifier of the master asset terminal 600*a*, which is the same as the detected unique identifier.

The location information storage module 720 detects a unique identifier and a corrected asset location from the asset location storage request in response to an asset location storage request of the correction module 740. The location information storage module 720 stores the corrected asset location in conjunction with the unique identifier of the slave asset terminal 600*b*, which is the same as the detected unique identifier.

The reference location generation module 730 generates the asset location of the master asset terminal 600*a* stored in the location information storage module 720 to the reference location of the slave asset terminal 600*b*. The reference location generation module 730 generates the reference location storage request including the unique identifier and the reference location of the master asset terminal 600*a* and transmits the reference location storage request to the location information storage module 720. The reference location generation module 730 transmits a location correction request including the unique identifier and the reference location of the master asset terminal 600*a* to the correction module 740.

The correction module 740 generates a corrected asset location in response to the location correction request of the reference location generation module 730. In other words, the correction module 740 detects the unique identifier, the reference location, and the relative location of the slave asset terminal 600*b* from the location correction request.

The correction module 740 arranges the master asset terminal 600*a* at a reference location, reflects the relative location using the reference location as a reference point, arranges the slave asset terminal 600*b*, and generates the corrected asset location of the slave asset terminal 600*b*. The correction module 740 generates an asset location storage request including the unique identifier of the asset terminal 600 and the corrected asset location and transmits the asset location storage request to the location information storage module 720. The correction module 740 generates an asset 10 output request and transmits the asset output request to the output module 750.

The output module 750 outputs the master asset terminal 600*a* and the plurality of asset terminals 600*a* and 600*b* on a screen in response to the output request of the correction module 740. At this time, the output module 750 outputs a screen on which the master asset terminal 600*a* is displayed at the reference location and the asset terminal 600 is displayed at the corrected asset location.

Figure 33:
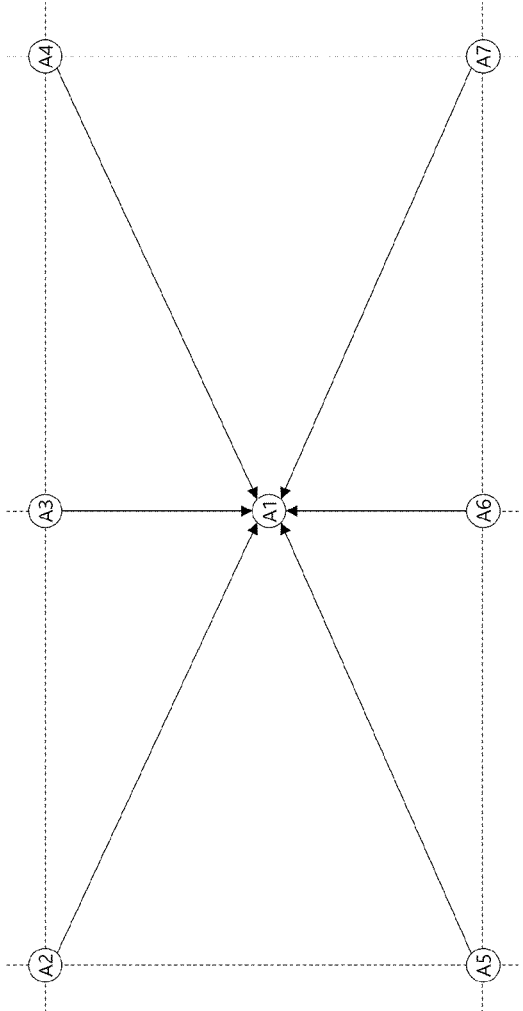
FIGS. 33 and 34 are views for describing an example in which the management server in FIG. 28 tracks (corrects) the location of the asset terminal.

Referring to FIG. 33, it is assumed that the first asset terminal A1 to the seventh asset terminal A7 are in a state of being stored in the yard, the first asset terminal A1 is set to the master asset terminal 600*a*, and the second asset terminal A2 to the seventh asset terminal A7 are set to the slave asset terminal 600*b*.

Figure 34:
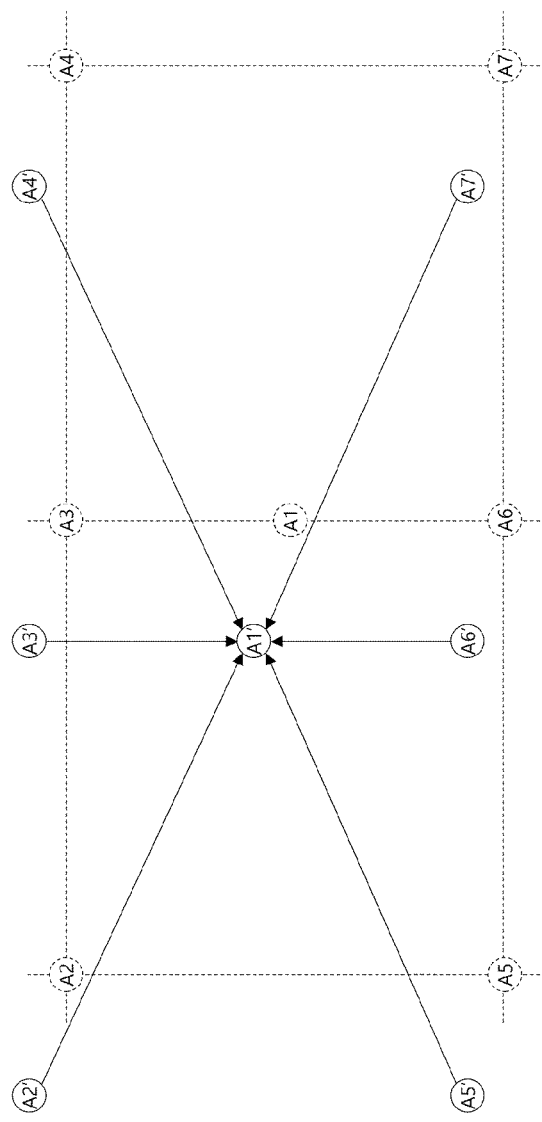

In this case, as illustrated in FIG. 34, since an asset location of the master asset terminal A1' is generated through GPS communication, a difference with an actual location occurs due to a GPS error. However, since relative locations of the slave asset terminals A2 to A7 are reflected and the locations of the slave asset terminals A2 to A7 are corrected based on the asset location of the master asset terminal A1', the relative locations between the assets may be accurately tracked.

Hereinafter, the asset tracking method according to the embodiment of the present disclosure will be described with reference to the accompanying drawings.

Referring to FIG. 35, the plurality of slave asset terminals 600*b* form one or more groups through mutual communication (S310). In this case, as an example, the plurality of slave asset terminals 600*b* measure relative distances through UWB communication therebetween and form one or more groups based on the relative distances.

One of the slave asset terminals 600*b* belonging to each group is set to the master asset terminal 600*a*, and the remainder is set to the slave asset terminals 600*b* (S320). In this case, as an example, the asset terminals 600*a* and 600*b* set the master asset terminal 600*a* in consideration of the remaining battery capacity, a communication range, quality, and the like.

The slave asset terminal 600*b* stops measuring the asset location (S330). In other words, the slave asset terminal 600*b* sets the first communication module 610*b*, which is a GPS communication module, and the asset location generation module 620*b* to sleep mode to stop receiving GPS signals and generating asset locations. Therefore, by improving the efficiency of the battery mounted on the slave asset terminal 600*b*, it is possible to extend a period during which the locations of assets loaded for a long time may be tracked.

The management server 700 collects the asset location, which is the GPS-based location information, from the master asset terminal 600*a* of each group (S340). The master asset terminal 600*a* of each group measures the asset locations based on the GPS signals and transmits the asset locations to the management server 700 at the request of the management server 700. The management server 700 stores the asset locations received from the master asset terminal 600*a*. At this time, the management server 700 stores the asset locations in conjunction with the unique identifier and the asset location of the master asset terminal 600*a*.

The management server 700 collects the relative location, which is the UWB-based location information, from the master asset terminal 600*a* of each group (S350). The master asset terminal 600*a* performs UWB communication with the slave asset terminals 600*b* of the same group to measure the relative location of the slave asset terminal 600*b* based on the master asset terminal 600*a* and transmits the relative location to the management server 700 according to the request of the management server 700. The management server 700 stores the relative location received from the master asset terminal 600*a*. At this time, the management server 700 stores the relative location in conjunction with the unique identifier and the relative location of the slave asset terminal 600*b* and the unique identifier of the master asset terminal 600*a*.

The management server 700 sets the asset location of the master asset terminal 600*a* to the reference location. The management server 700 stores the reference location in conjunction with the unique identifier of the master asset terminal 600*a*.

The management server 700 reflects the relative location based on the reference location set in operation S360 and generates the corrected asset locations of the slave asset terminals 600*b* (S370). The management server 700 detects the unique identifier and the asset location of the slave asset terminal 600*b* connected to the unique identifier of the same master asset terminal 600*a*. The management server 700 sets the reference location to the reference point and generates the corrected asset location of each slave asset terminal 600*b* by reflecting the relative location and arranging the slave asset terminal 600*b*. The management server 700 stores the unique identifier and the corrected asset location of the slave asset terminal 600*b* in conjunction with each other.

The management server 700 displays the master asset terminal 600*a* and the slave asset terminal 600*b* based on the stored corrected asset location (S380). In other words, the management server 700 outputs the master asset terminal 600*a* and the plurality of slave asset terminals 600*b* on the screen, displays the master asset terminal 600*a* at the reference location, and displays the slave asset terminal 600*b* at the corrected asset location.

Meanwhile, when the asset terminal set to the master asset terminal 600*a* in operation S320 continuously operates as the master asset terminal 600*a*, the battery efficiency of the corresponding asset terminal is inevitably degraded. Therefore, the plurality of asset terminals 600*a* and 600*b* change the master asset terminal 600*a* to another asset terminal depending on GPS communication quality, UWB communication quality, the remaining battery level, or the like. In other words, one of the slave asset terminals 600*b* is set to a new master asset terminal 600*a*, and the current master asset terminal 600*a* is changed to the slave asset terminal 600*b*.

Therefore, in the asset tracking method according to the embodiment of the present disclosure, by accurately tracking the relative locations between the assets and improving the efficiency of the battery mounted on the asset terminal, it is possible to extend the period during which the locations of the assets loaded for a long time may be tracked.

Although the preferred embodiments of the present disclosure have been described above, modifications can be made in various forms, and those skilled in the art can carry out various changes and modifications without departing from the claims of the present disclosure.

The invention claimed is:

1. An asset tracking system comprising:

a reference terminal;

a plurality of asset terminals installed on an asset to be tracked and configured to perform UWB communication with the reference terminal and measure a relative location based on the reference terminal; and a management server configured to collect asset locations and the relative locations from the plurality of asset terminals and correct the asset locations of the asset terminals using the relative locations, wherein the plurality of asset terminals generate relative locations through UWB communication therebetween and form one or more groups including one master asset terminal and a plurality of slave asset terminals based on the relative locations, one of the plurality of slave asset terminals included in a first group is set to a master asset terminal of the first group based on at least one of GPS communication quality, UWB communication quality, and the remaining battery capacity, and a current master asset terminal of the first group is set to a slave asset terminal of the first group, the plurality of slave asset terminals are installed on assets to be tracked to measure asset locations based on GPS signals, perform UWB communication with the master asset terminal, and measure relative locations based on the master asset terminal, the master asset terminal is the reference terminal and is installed on the asset to be tracked to measure asset locations based on the GPS signals and collect the asset locations and relative locations from the plurality of slave asset terminals belonging to the same group, and the management server collects the asset locations and the relative locations of the plurality of slave asset terminals from the master asset terminal and corrects the asset locations using the relative locations.

2. The asset tracking system of claim 1, wherein each of the plurality of asset terminals include:

a first communication module configured to receive GPS signals;

an asset location generation module configured to generate an asset location corresponding to a current location of an asset based on the GPS signals received by the first communication module and generate first location information including a unique identifier of the asset terminal;

a second communication module configured to transmit and receive a UWB signal to and from the reference terminal and receive a delay time of the UWB signal;

a relative location generation module configured to generate a relative location corresponding to a direction and a distance from the reference terminal based on the delay time received by the second communication module and generate second location information including the relative location and the unique identifier of the asset terminal;

a control module configured to collect the first location information generated from the asset location generation module and the second location information generated from the relative location generation module and transmit a location information transmission request including at least one of the first location information and the second location information; and a third communication module configured to convert the first location information and the second location information into a Sigfox protocol in response to the location information transmission request of the control module and then transmit the converted first and second location information to the management server.

3. The asset tracking system of claim 1, wherein the management server includes:

a fourth communication module configured to receive first location information and second location information from the plurality of asset terminals and output a location information storage request including the first location information and the second location information;

a location information storage module configured to store the first location information and the second location information in conjunction with a unique identifier of the asset terminal detected from the first location information and the second location information, a unique identifier of the reference terminal, an asset location, and a relative location in response to the location information storage request of the fourth communication module;

a reference location generation module configured to generate a reference location corresponding to a location of the reference terminal based on the asset locations and the relative locations stored in the location information storage module and output a location correction request including the reference location and the unique identifier of the reference terminal; and a correction module configured to detect a unique identifier and a relative location of an asset terminal connected to the unique identifier of the reference terminal, set the reference location to a reference point, and generate a location corresponding to a direction and a distance of the relative location from the reference point as a corrected asset location of the asset terminal, in response to the location correction request of the reference location correction module, and the reference location generation module is configured to:

extract a midpoint of two asset terminals located at facing points based on the reference terminal and generate a center point of a figure connecting the extracted mid-points as the reference location; and extract one of a ½ point of a straight line connecting asset locations of two asset terminals and a ½ point of a straight line connecting locations moved in a direction of relative locations from the asset locations of the two asset terminals by distances of the relative locations as a midpoint.

4. The asset tracking system of claim 1, wherein the master asset terminal includes:

a first communication module configured to receive GPS signals;

an asset location generation module configured to generate an asset location corresponding to a current location of an asset based on the GPS signals received by the first communication module and generate first location information including a unique identifier of the asset terminal;

a second communication module configured to transmit and receive a UWB signal to and from the plurality of slave asset terminals, output one of an advertising signal and a location measurement request signal to the slave asset terminals, transmit a first UWB pulse to an asset terminal transmitting a ranging request signal, then receive a second UWB pulse from the asset terminal, measure a delay time between the first UWB pulse and the second UWB pulse, and transmit the delay time to the slave asset terminals;

a control module configured to receive the first location information after transmitting an asset location generation request to the asset location generation module in response to the asset location generation request, receive asset locations and relative locations of the plurality of slave asset terminals in response to the location information collection request after transmitting a location information collection request, and transmit the first location information and a location information transmission request including the asset locations and the relative locations of the plurality of slave asset terminals; and a third communication module configured to collect the asset locations and the relative locations from the plurality of slave asset terminals belonging to the same group in response to the location information collection request of the control module, transmit the asset locations and the relative locations to the control module, convert the first location information and the asset locations and the relative locations of the plurality of slave asset terminals into a Sigfox protocol in response to the location information transmission request of the control module, and then transmit the converted first location information, asset locations, and relative locations to the management server.

5. The asset tracking system of claim 1, wherein each of the plurality of slave asset terminals include:

a first communication module configured to receive GPS signals;

an asset location generation module configured to generate an asset location corresponding to a current location of an asset based on the GPS signals received by the first communication module and generate first location information including the asset location and a unique identifier of the slave asset terminal;

a second communication module configured to transmit and receive a UWB signal to and from the master asset terminal and receive a delay time of the UWB signal;

a relative location generation module configured to generate a relative location corresponding to a direction and a distance from the master asset terminal based on the delay time received by the second communication module and generate second location information including the relative location and the unique identifier of the slave asset terminal;

a control module configured to collect the first location information generated from the asset location generation module and the second location information generated from the relative location generation module and transmit a location information transmission request including at least one of the first location information and the second location information; and a third communication module configured to convert the first location information and the second location information into a Sigfox protocol in response to the location information transmission request of the control module and then transmit the converted first and second location information to the master asset terminal.

6. The asset tracking system of claim 1, wherein the management server includes:

a fourth communication module configured to receive the first location information and the asset locations and the relative locations of the plurality of slave asset terminals from the master asset terminal and output a location information storage request including the first location information and the asset locations and the relative locations of the plurality of slave asset terminals;

a location information storage module configured to store the first location information and the asset locations and the relative locations of the plurality of slave asset terminals in response to the location information storage request of the fourth communication module;

a reference location generation module configured to generate a reference location corresponding to a location of the master asset terminal based on the asset locations and the relative locations stored in the location information storage module and output a location correction request including the reference location and a unique identifier of the master asset terminal; and a correction module configured to detect a unique identifier and a relative location of a slave asset terminal connected to the unique identifier of the master asset terminal, set the reference location to a reference point, and generate a location corresponding to a direction and a distance of the relative location from the reference point as a corrected asset location of the asset terminal, in response to the location correction request of the reference location correction module.

7. An asset tracking system comprising:

a reference terminal;

a plurality of asset terminals installed on an asset to be tracked and configured to perform UWB communication with the reference terminal and measure a relative location based on the reference terminal; and a management server configured to collect asset locations and the relative locations from the plurality of asset terminals and correct the asset locations of the asset terminals using the relative locations, wherein the plurality of asset terminals generate relative locations through UWB communication therebetween and form one or more groups including one master asset terminal and a plurality of slave asset terminals based on the relative locations, the plurality of slave asset terminals are installed on assets to be tracked to perform UWB communication with the master asset terminal belonging to the same group and measure relative locations based on the master asset terminal, the master asset terminal is the reference terminal and is installed on the asset to be tracked to measure asset locations based on the GPS signals and collect relative locations from the plurality of slave asset terminals belonging to the same group, and the management server collects the asset location of the master asset terminal and the relative locations of the plurality of slave asset terminals from the master asset terminal of each group, sets the asset location to a reference location, reflects the relative location in the asset location based on the reference location, and generates corrected asset locations of the plurality of salve asset terminals.

8. The asset tracking system of claim 7, wherein each of the plurality of asset terminals include:

a first communication module configured to receive GPS signals; and an asset location generation module configured to generate an asset location corresponding to a current location of an asset based on the GPS signals received by the first communication module and generate first location information including the asset location and a unique identifier of the asset terminal, and an asset terminal set to the slave asset terminal among the plurality of asset terminals stops generating an asset location by setting the first communication module and the asset location generation module to a sleep mode.

9. The asset tracking system of claim 7, wherein the management server generates a location moved in a direction of the relative location from the reference location by a distance of the relative location as a corrected asset location of the slave asset terminal.

10. An asset tracking method performed by a management server capable of communicating with a reference terminal and a plurality of asset terminals, comprising:

collecting asset locations generated based on GPS signals from the plurality of asset terminals;

collecting relative locations based on the reference terminal generated through UWB communication between the reference terminal and the asset terminals from the plurality of asset terminals;

generating a reference location corresponding to the reference terminal based on the asset locations collected in the collecting of the asset locations; and setting the reference location generated in the generating of the reference location to a reference point and generating a location moved in a direction of a relative location from the reference point by a distance of the relative location as the corrected asset locations.

11. The asset tracking method of claim 10, wherein the generating of the reference location includes:

extracting a midpoint of two asset terminals located at facing points based on the reference terminal and extracting one of a ½ point of a straight line connecting asset locations of the two asset terminals located at the facing points based on the reference terminal and a ½ point of a straight line connecting locations moved in a direction of relative locations from the asset locations of the two asset terminals located at the facing points based on the reference terminal by distances of the relative locations as a midpoint; and generating a center point of a figure connecting the extracted midpoints as the reference location.

12. An asset tracking method comprising:

forming, by a plurality of asset terminals, one or more groups through mutual communication;

setting a master asset terminal and a plurality of slave asset terminals of a group by asset terminals belonging to each group in the forming of the group;

collecting, by a management server, one of asset locations of the plurality of slave asset terminals generated based on GPS signals from the master asset terminal of each group and an asset location of the master asset terminal;

collecting, by the management server, relative locations of the plurality of slave asset terminals based on the master asset terminal from the master asset terminal of each group;

setting, by the management server, a reference location based on the asset location of the master asset terminal collected in the collecting of the asset location; and reflecting, by the management server, the relative locations based on the reference location generated in the generating of the reference location to generate corrected asset locations of the plurality of slave asset terminals.

13. The asset tracking method of claim 12, further comprising collecting, by the master asset terminal, asset locations and relative locations from the plurality of slave asset terminals before the collecting of the relative locations, wherein the relative locations of the plurality of slave asset terminals are generated through UWB communication between the master asset terminal and the plurality of slave asset terminals.

14. The asset tracking method of claim 12, wherein the forming of the group includes generating relative locations through UWB communication between the plurality of slave asset terminals and forming one or more groups based on the relative locations.

15. The asset tracking method of claim 12, further comprising: setting one of the plurality of slave asset terminals to the master asset terminal based on at least one of GPS communication quality, UWB communication quality, and the remaining battery capacity; and setting a current master asset terminal to the slave asset terminal.

16. The asset tracking method of claim 12, further comprising stopping a GPS communication module by asset terminals set to the slave asset terminal in the setting, wherein the stopping includes stopping receiving GPS signals and generating asset locations by setting an asset terminal set to the slave asset terminal among the plurality of slave asset terminals to a sleep mode.

17. The asset tracking method of claim 12, wherein the generating of the reference location includes:

extract a midpoint of two slave asset terminals located at facing points based on the master asset terminal and generate a center point of a figure connecting the extracted midpoints as the reference location; and extracting one of a ½ point of a straight line connecting asset locations of the two slave asset terminals located at the facing points based on the master asset terminal and a ½ point of a straight line connecting locations moved in a direction of relative locations from the asset locations of the two slave asset terminals located at the facing points based on the master asset terminal by distances of the relative locations as a midpoint.

18. The asset tracking method of claim 12, wherein the generating of the corrected asset location includes setting the reference location to a reference point and generating a location moved in a direction of a relative location from the reference point by a distance of the relative location as a corrected asset location of the slave asset terminal.

* * * * *